United States Patent
Aoki

(10) Patent No.: US 12,469,591 B2
(45) Date of Patent: Nov. 11, 2025

(54) IMAGE DISPLAY SYSTEM, IMAGE-PROCESSING SYSTEM, AND IMAGE DISPLAY METHOD

(71) Applicant: OLYMPUS CORPORATION, Tokyo (JP)

(72) Inventor: Yasuhiro Aoki, Yokohama (JP)

(73) Assignee: OLYMPUS CORPORATION, Tokyo (JP)

( * ) Notice: Subject to any disclaimer, the term of this patent is extended or adjusted under 35 U.S.C. 154(b) by 314 days.

(21) Appl. No.: 18/218,625

(22) Filed: Jul. 6, 2023

(65) Prior Publication Data

US 2024/0021293 A1   Jan. 18, 2024

Related U.S. Application Data

(60) Provisional application No. 63/388,719, filed on Jul. 13, 2022.

(51) Int. Cl.
| | |
|---|---|
| *G16H 30/20* | (2018.01) |
| *G06F 3/14* | (2006.01) |
| *G06T 11/00* | (2006.01) |
| *G16H 30/40* | (2018.01) |

(52) U.S. Cl.
CPC ............. *G16H 30/20* (2018.01); *G06F 3/14* (2013.01); *G06T 11/00* (2013.01); *G16H 30/40* (2018.01)

(58) Field of Classification Search
CPC .......... G16H 30/20; G16H 30/40; G06F 3/14; G06T 11/00; A61B 1/000094; A61B 1/000096; A61B 1/0005
See application file for complete search history.

(56) References Cited

U.S. PATENT DOCUMENTS

| | | | |
|---|---|---|---|
| 2020/0169649 A1* | 5/2020 | Ouyang | A61B 1/00064 |
| 2022/0414885 A1* | 12/2022 | Kubo | G06T 7/0016 |
| 2023/0100302 A1* | 3/2023 | Asai | A61B 1/00009 705/2 |
| 2023/0346196 A1* | 11/2023 | Ushiroda | A61B 1/00006 |

FOREIGN PATENT DOCUMENTS

| | | |
|---|---|---|
| JP | 2022-042011 A | 3/2022 |
| WO | 2014/208630 A1 | 12/2014 |

\* cited by examiner

*Primary Examiner* — Iriana Cruz
(74) *Attorney, Agent, or Firm* — Scully, Scott, Murphy & Presser, P.C.

(57) ABSTRACT

An image display system includes a first processor disposed in a first system and a second processor disposed in a second system. The first processor is configured to transmit two or more first images to the second system and receive two or more second images from the second system. The first processor is configured to transmit, to the second system, first identification information added to a second image displayed on a monitor when a release signal has been received. The second processor is configured to acquire a temporary image to which the same second identification information is added as the first identification information among two or more temporary images stored on a buffer.

20 Claims, 17 Drawing Sheets

IMAGE DISPLAY SYSTEM, IMAGE-PROCESSING SYSTEM, AND IMAGE DISPLAY METHOD

Priority is claimed on U.S. provisional patent application Ser. No. 63/388,719, filed on Jul. 13, 2022, the content of which is incorporated herein by reference.

BACKGROUND OF THE INVENTION

Field of the Invention

The present invention relates to an image display system, an image-processing system, and an image display method.

Description of Related Art

An image display system that displays images acquired by an endoscope on a monitor has been developed. A user such as a doctor observes the images displayed on the monitor and performs diagnosis or the like.

A system using a capsule endoscope is disclosed in PCT International Publication No. WO2014/208630. Images acquired by the capsule endoscope are wirelessly transmitted. A device disposed outside a subject receives the images transmitted from the capsule endoscope and processes the images. In an example of this system, a transmission period of images is the same as an imaging period.

SUMMARY OF THE INVENTION

According to a first aspect of the present invention, an image display system is configured to transmit two or more first images acquired by an endoscope in a first system to a second system, transmit two or more second images generated from the two or more first images in the second system to the first system, and display the two or more second images in the first system. A first processor disposed in the first system is configured to: transmit the two or more first images acquired by the endoscope to the second system; receive a release signal indicating an instruction to acquire an image; receive the two or more second images from the second system; and output the two or more second images to a monitor disposed in the first system. A second processor disposed in the second system is configured to: receive the two or more first images from the first system; generate the two or more second images by processing the two or more first images; transmit the two or more second images to which first identification information is added to the first system; and store two or more temporary images on a buffer. The two or more temporary images are at least two of the two or more first images or at least two of two or more third images generated from the two or more first images. The second identification information is added to the two or more temporary images. The second identification information of each of the two or more temporary images is the same as the first identification information of any one of the two or more second images. The first processor is configured to transmit, to the second system, the first identification information added to a second image that is any one of the two or more second images and is displayed on the monitor when the release signal has been received. The second processor is configured to receive the first identification information transmitted by the first processor and acquire a temporary image to which the same second identification information is added as the first identification information received from the first processor among the two or more temporary images stored on the buffer.

According to a second aspect of the present invention, in the first aspect, the image display system may include a release switch that is disposed in the first system and is configured to output the release signal.

According to a third aspect of the present invention, in the second aspect, the image display system may include a second release switch and a third processor disposed in a third system different from any one of the first system and the second system. The second release switch is configured to output a second release signal indicating an instruction to acquire an image. The third processor is configured to: receive the second release signal; receive the two or more second images from the second system; output the two or more second images to a second monitor disposed in the third system; and transmit, to the second system, the first identification information added to a second image that is any one of the two or more second images and is displayed on the second monitor when the second release signal has been received. The second processor may be configured to transmit the two or more second images to which the first identification information is added to the third system and receive the first identification information from the third system.

According to a fourth aspect of the present invention, in the first aspect, the second processor may be configured to record the temporary image acquired from the buffer on a recording medium disposed in the second system.

According to a fifth aspect of the present invention, in the first aspect, the second processor may be configured to transmit the temporary image acquired from the buffer to the first system. The first processor may be configured to receive the temporary image transmitted by the second processor and record the temporary image that has been received on a recording medium disposed in the first system.

According to a sixth aspect of the present invention, in the first aspect, the first system and the second system may be included in the same medical facility.

According to a seventh aspect of the present invention, in the first aspect, the second processor may be configured to generate the two or more second images by performing first image processing on the two or more first images and generate the two or more third images by performing second image processing different from the first image processing on the two or more first images.

According to an eighth aspect of the present invention, in the first aspect, the first processor may be configured to generate two or more fourth images by performing first image processing on the two or more first images and selectively output the two or more second images or the two or more fourth images to the monitor. The second processor may be configured to generate the two or more second images by performing second image processing different from the first image processing on the two or more first images.

According to a ninth aspect of the present invention, in the first aspect, the first identification information and the second identification information may be timestamps.

According to a tenth aspect of the present invention, in the first aspect, the two or more third images may be the two or more second images.

According to an eleventh aspect of the present invention, in the first aspect, the two or more first images may constitute RAW data.

According to a twelfth aspect of the present invention, an image-processing system is configured to receive two or more first images acquired by an endoscope in an image-acquiring system including a monitor and transmit two or more second images generated from the two or more first images to the image-acquiring system. The image-processing system includes a processor configured to: receive the two or more first images from the image-acquiring system; generate the two or more second images by processing the two or more first images; transmit the two or more second images to which first identification information is added to the image-acquiring system; store two or more temporary images on a buffer. The two or more temporary images are at least two of the two or more first images or at least two of two or more third images generated from the two or more first images. Second identification information is added to the two or more temporary images. The second identification information of each of the two or more temporary images is the same as the first identification information of any one of the two or more second images. The processor is configured to receive first identification information transmitted by the image-acquiring system. The first identification information transmitted by the image-acquiring system is the same as that added to a displayed image. The displayed image is any one of the two or more second images received in the image-acquiring system. The displayed image is a second image displayed on the monitor when the release signal has been received in the image-acquiring system. The processor is configured to acquire a temporary image to which the same second identification information is added as the first identification information received from the image-acquiring system among the two or more temporary images stored on the buffer.

According to a thirteenth aspect of the present invention, an image display method is used for transmitting two or more first images acquired by an endoscope in a first system to a second system, transmitting two or more second images generated from the two or more first images in the second system to the first system, and displaying the two or more second images in the first system. The image display method includes: transmitting the two or more first images acquired by the endoscope disposed in the first system to the second system; receiving, in the second system, the two or more first images from the first system; generating the two or more second images by processing the two or more first images in the second system; transmitting the two or more second images to which first identification information is added from the second system to the first system; and storing two or more temporary images on a buffer in the second system. The two or more temporary images are at least two of the two or more first images or at least two of two or more third images generated from the two or more first images. Second identification information is added to the two or more temporary images. The second identification information of each of the two or more temporary images is the same as the first identification information of any one of the two or more second images. The image display method includes: receiving, in the first system, the two or more second images from the second system; outputting the two or more second images to a monitor disposed in the first system; receiving a release signal indicating an instruction to acquire an image in the first system; transmitting, to the second system, the first identification information added to a second image that is any one of the two or more second images and is displayed on the monitor when the release signal has been received; receiving, in the second system, the first identification information from the first system; and acquiring a temporary image to which the same second identification information is added as the first identification information received from the first system among the two or more temporary images stored on the buffer.

According to a fourteenth aspect of the present invention, in the thirteenth aspect, a release switch disposed in the first system may output the release signal.

According to a fifteenth aspect of the present invention, in the fourteenth aspect, a second release switch disposed in a third system different from any one of the first system and the second system may output a second release signal indicating an instruction to acquire an image. The image display method may include receiving the second release signal in the third system; transmitting the two or more second images to which the first identification information is added from the second system to the third system; receiving, in the third system, the two or more second images from the second system; outputting the two or more second images to a second monitor disposed in the third system; transmitting, from the third system to the second system, the first identification information added to a second image that is any one of the two or more second images and is displayed on the second monitor when the second release signal has been received; and receiving, in the second system, the first identification information from the third system.

According to a sixteenth aspect of the present invention, in the thirteenth aspect, the image display method may include recording the temporary image acquired from the buffer on a recording medium disposed in the second system.

According to a seventeenth aspect of the present invention, in the thirteenth aspect, the image display method may include transmitting the temporary image acquired from the buffer from the second system to the first system; receiving, in the first system, the temporary image from the second system; and recording the temporary image received in the first system on a recording medium disposed in the first system.

According to an eighteenth aspect of the present invention, in the thirteenth aspect, the first system and the second system may be included in the same medical facility.

According to a nineteenth aspect of the present invention, in the thirteenth aspect, the image display method may include generating the two or more second images by performing first image processing on the two or more first images in the second system and generating the two or more third images by performing second image processing different from the first image processing on the two or more first images.

According to a twentieth aspect of the present invention, in the thirteenth aspect, the image display method may include: generating two or more fourth images by performing first image processing on the two or more first images in the first system; selectively outputting the two or more second images or the two or more fourth images to the monitor in the first system; and generating the two or more second images by performing second image processing different from the first image processing on the two or more first images.

DETAILED DESCRIPTION OF THE INVENTION

Hereinafter, embodiments of the present invention will be described with reference to the drawings.

First Embodiment

Figure 1:
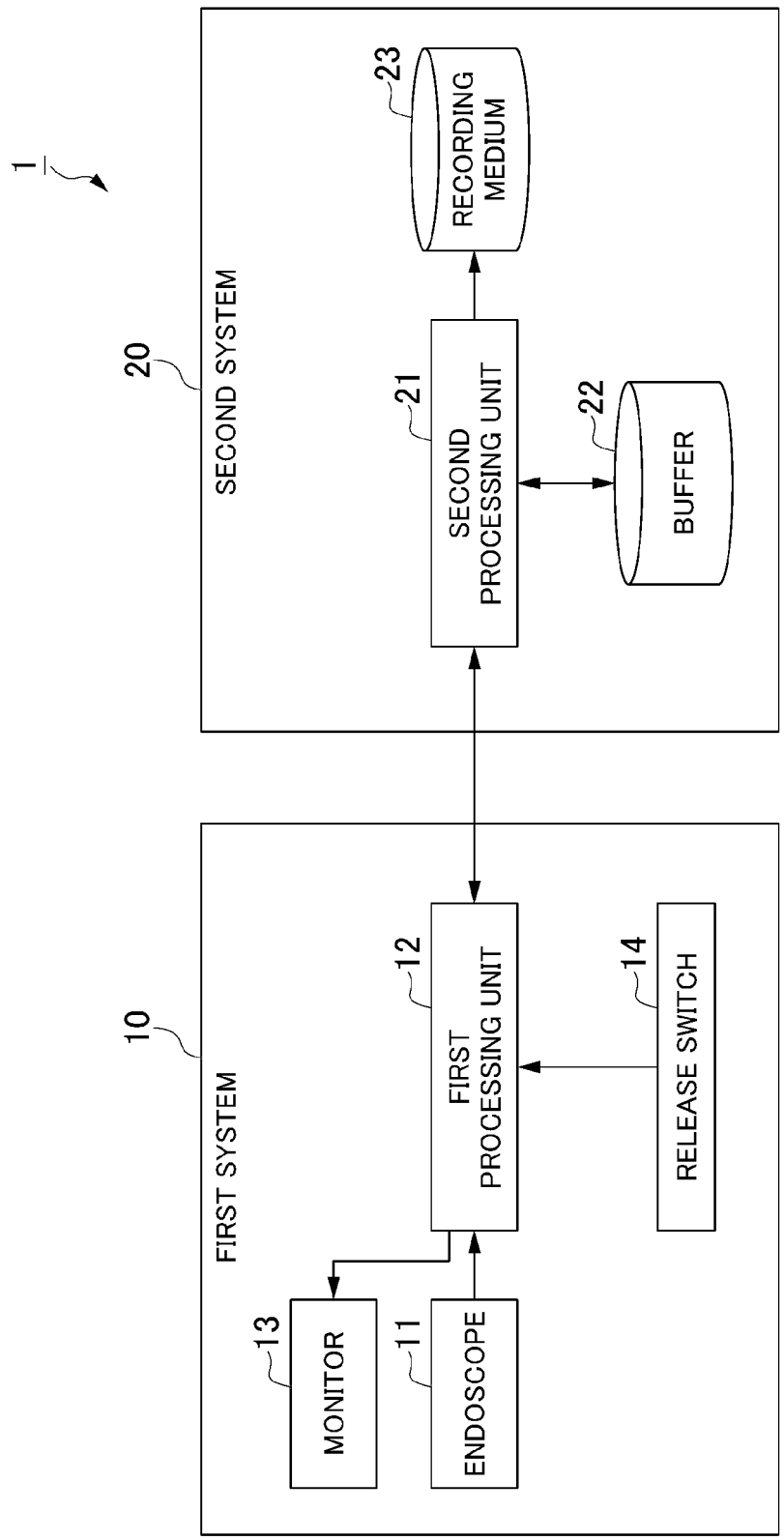
FIG. 1 is a block diagram showing a configuration of an image display system according to a first embodiment of the present invention.

A first embodiment of the present invention will be described. FIG. 1 shows a configuration of an image display system 1 according to the first embodiment. The image display system 1 shown in FIG. 1 includes a first system 10 (image-acquiring system) and a second system 20 (image-processing system).

The first system 10 transmits two or more first images acquired by an endoscope to the second system 20. The second system 20 transmits two or more second images generated from the two or more first images to the first system 10. The first system 10 displays the two or more second images received from the second system 20 on a monitor.

The first system 10 includes an endoscope 11, a first processing unit 12, a monitor 13, and a release switch 14. The second system 20 includes a second processing unit 21, a buffer 22, and a recording medium 23. For example, the first system 10 is a local system in a hospital, and the second system 20 is a cloud system. The first system 10 and the second system 20 are connected via the Internet.

A schematic configuration of the image display system 1 will be described. The first processing unit 12 transmits two or more first images acquired by the endoscope 11 to the second system 20. The first processing unit 12 receives a release signal indicating an instruction to acquire an image from the release switch 14. The first processing unit 12 receives two or more second images from the second system 20 and outputs the two or more second images to the monitor 13. The second processing unit 21 receives the two or more first images from the first system 10. The second processing unit 21 generates the two or more second images by processing the two or more first images. The second processing unit 21 transmits the two or more second images to which first identification information is added to the first system 10. The second processing unit 21 temporarily stores two or more temporary images on the buffer 22. The two or more temporary images are at least two of the two or more first images or are at least two of two or more third images generated from the two or more first images. Second identification information is added to the two or more temporary images. The second identification information of each of the two or more temporary images is the same as the first identification information of any one of the two or more second images.

The first processing unit 12 transmits, to the second system 20, the first identification information added to a second image that is any one of the two or more second images and is displayed on the monitor 13 when the release signal has been received. The second processing unit 21 receives the first identification information transmitted by the first processing unit 12. The second processing unit 21 acquires a temporary image to which the same second identification information is added as the first identification information received from the first processing unit 12 among the two or more temporary images stored on the buffer 22.

A detailed configuration of the image display system 1 will be described. The endoscope 11 is a camera and includes an elongated insertion unit and an image sensor disposed in the distal end of the insertion unit. The endoscope 11 is inserted into a living body and sequentially generates two or more first images of the inside of the living body. The two or more first images constitute a video. Each of the two or more first images constitutes RAW data. The endoscope 11 is connected to the first processing unit 12 by a cable. The endoscope 11 outputs the two or more first images to the first processing unit 12.

The first processing unit 12 sequentially transmits the two or more first images output from the endoscope 11 to the second system 20 and sequentially receives two or more second images transmitted from the second system 20.

Communication between the first processing unit 12 and the second processing unit 21 is executed via a network. The first processing unit 12 sequentially outputs the two or more second images to the monitor 13.

The monitor 13 is a display such as a liquid crystal monitor. The monitor 13 sequentially displays the two or more second images output from the first processing unit 12.

The release switch 14 includes a button or the like operated by a user. The user observes the second images displayed on the monitor 13 and operates the release switch 14 in order to record a second image in which a lesion part or the like is seen. At this time, the release switch 14 outputs a release signal to the first processing unit 12.

The second processing unit 21 receives the two or more first images transmitted by the first processing unit 12. The second processing unit 21 generates two or more second images by processing the two or more first images. The second processing unit 21 adds a timestamp as identification information to each of the two or more second images. Timestamps do not match each other between the two or more second images. The second processing unit 21 sequentially stores the two or more second images to which the timestamps are added on the buffer 22. The second processing unit 21 sequentially transmits the two or more second images to which the timestamps are added to the first processing unit 12.

The buffer 22 is a volatile memory such as a random-access memory (RAM) or a dynamic random-access memory (DRAM). The buffer 22 temporarily stores the two or more second images to which the timestamps are added. After a predetermined amount of second images are accumulated on the buffer 22, the oldest second image is deleted from the buffer 22 and a new second image is stored on the buffer 22.

When the release signal has been received from the release switch 14, the first processing unit 12 acquires a timestamp added to a second image displayed on the monitor 13. The first processing unit 12 transmits the release signal to which the timestamp is added to the second processing unit 21.

The second processing unit 21 receives the release signal. When the release signal has been received, the second processing unit 21 acquires, from the buffer 22, a second image to which the same timestamp is added as that added to the release signal and records the second image on the recording medium 23. The second image is the same as that displayed on the monitor 13 when the release signal has been output front the release switch 14.

The recording medium 23 is a non-volatile recording medium such as a static random-access memory (SRAM), an erasable programmable read-only memory (EPROM), an electrically erasable programmable read-only memory (EEPROM), a flash memory, a hard disk drive (HDD), or a solid-state drive (SSD).

A variable delay may occur in the network between the first processing unit 12 and the second processing unit 21. Therefore, the difference between a timing at which the second processing unit 21 generates a second image and a timing at which the monitor 13 displays the second image may change in accordance with the delay. The second processing unit 21 acquires, from the buffer 22, a second image to which the timestamp added to the release signal is added and therefore can acquire the second image intended by a user without being influenced by the delay in the network.

The first processing unit 12 and the second processing unit 21 are constituted by at least one of a processor and a logic circuit. For example, the processor is at least one of a central processing unit (CPU), a digital signal processor (DSP), and a graphics-processing unit (GPU). For example, the logic circuit is at least one of an application-specific integrated circuit (ASIC) and a field-programmable gate array (FPGA). The first processing unit 12 and the second processing unit 21 may include one or a plurality of processors. The first processing unit 12 and the second processing unit 21 may include one or a plurality of logic circuits.

A computer may read a program and may execute the read program. The program includes commands defining the operations of at least one of the first processing unit 12 and the second processing unit 21. In other words, the functions of at least one of the first processing unit 12 and the second processing unit 21 may be realized by software.

The program described above, for example, may be provided by using a "computer-readable recording medium" such as a flash memory. The program may be transmitted from the computer storing the program to the image display system 1 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). The functions described above may be realized by a combination of a program that has already been recorded in a computer and a differential program.

A timestamp may be added to each first image in the first system 10. For example, the endoscope 11 may generate a first image to which a timestamp is added. Alternatively, the first processing unit 12 may add a timestamp to a first image output from the endoscope 11.

The identification information added to each second image is not necessarily time information such as a timestamp. Information for identifying each second image has only to be added to each second image. For example, a frame number added to each second image may be used instead of a timestamp.

Figure 2:
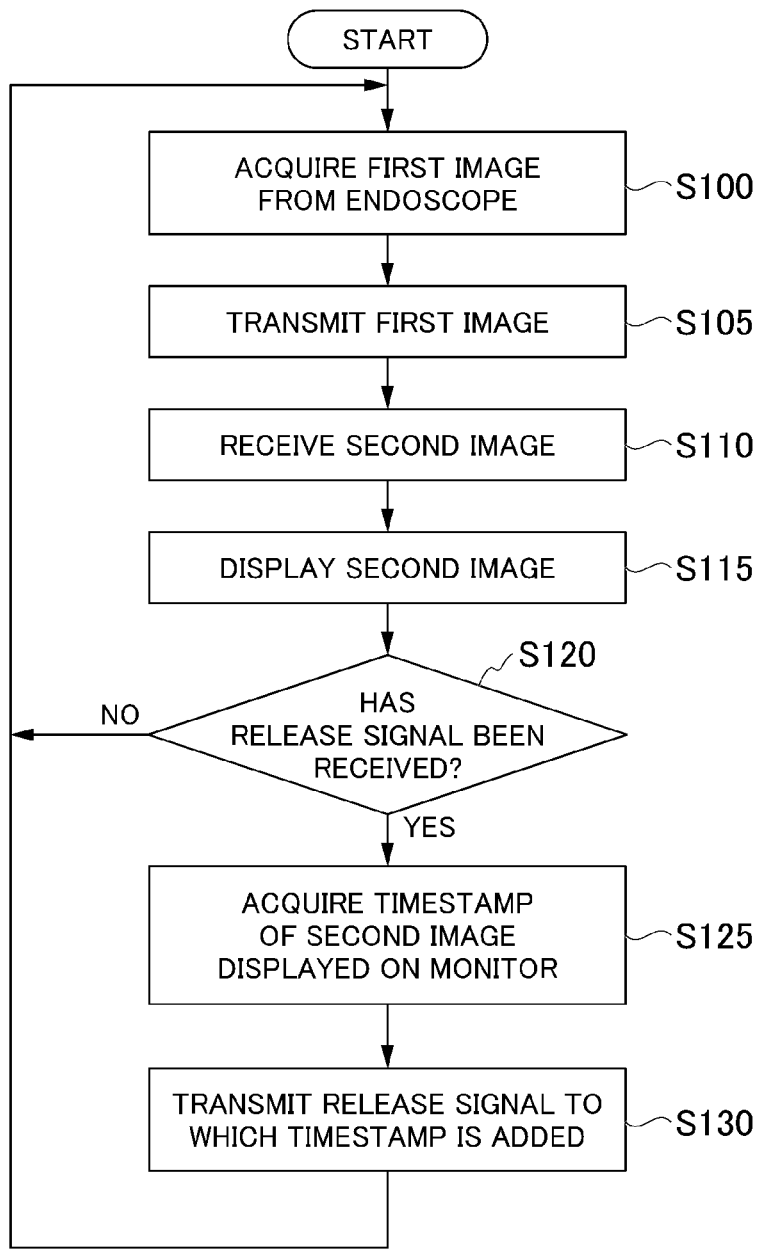
FIG. 2 is a flow chart showing a procedure of processing executed by a first processing unit included in the image display system according to the first embodiment of the present invention.

An operation of the first processing unit 12 will be described by using FIG. 2. FIG. 2 shows a procedure of processing executed by the first processing unit 12.

The first processing unit 12 acquires a first image from the endoscope 11 (Step S100).

After Step S100, the first processing unit 12 transmits the first image acquired in Step S100 to the second processing unit 21 (Step S105).

After Step S105, the first processing unit 12 receives a second image from the second processing unit 21 (Step S110). A timestamp is added to the second image. The second image is stored on a buffer not shown in FIG. 1.

After Step S110, the first processing unit 12 displays the second image received in Step S110 on the monitor 13 (Step S115).

After Step S115, the first processing unit 12 determines whether a release signal has been received (Step S120).

When the first processing unit 12 has determined that the release signal has not been received in Step S120. Step S100 is executed. When the first processing unit 12 has determined that the release signal has been received in Step S120, the first processing unit 12 acquires a timestamp added to the second image displayed on the monitor 13 from the buffer (Step S125).

After Step S125, the first processing unit 12 adds the timestamp acquired in Step S125 to the release signal. The first processing unit 12 transmits the release signal to which the timestamp is added to the second processing unit 21 (Step S130). After Step S130, Step S100 is executed.

Figure 3:
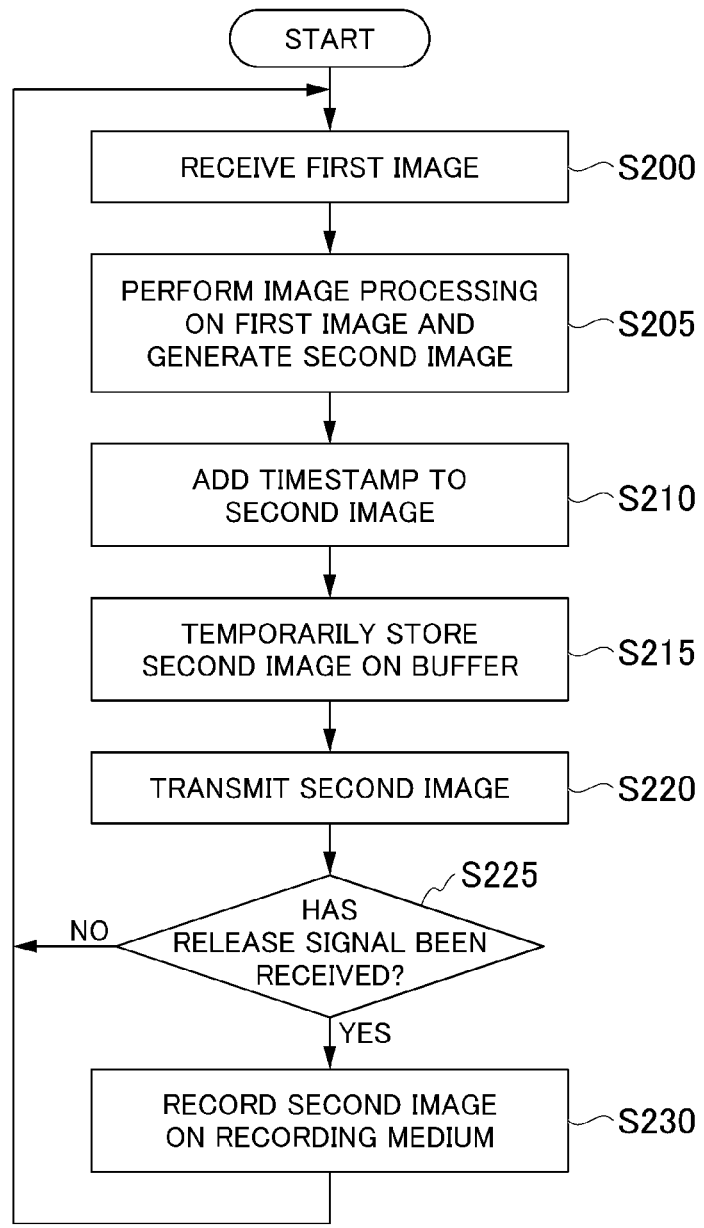
FIG. 3 is a flow chart showing a procedure of processing executed by a second processing unit included in the image display system according to the first embodiment of the present invention.

An operation of the second processing unit 21 will be described by using FIG. 3. FIG. 3 shows a procedure of processing executed by the second processing unit 21.

The second processing unit 21 receives the first image transmitted by the first processing unit 12 (Step S200).

After Step S200, the second processing unit 21 performs image processing on the first image received in Step S200 and generates a second image (Step S205). For example, the second processing unit 21 performs basic image processing or advanced image processing on the first image.

The basic image processing is at least one of signal noise correction, demosaicing, auto gain control, white balance adjustment, and dimming processing. The advanced image processing is at least one of color correction, gamma correction, brightness adjustment, chroma suppression, structure enhancement processing, texture-and-color enhancement imaging (TXI), brightness adjustment imaging with maintenance of contrast (BAI-MAC), red dichromatic imaging (RDI), digital zooming processing, artificial intelligence (AI) super-resolution processing, computer-aided detection (CADe), and computer-aided diagnosis (CADx).

After Step S205, the second processing unit 21 adds a timestamp to the second image generated in Step S205 (Step S210).

The second processing unit 21 may add a timestamp to the first image received in Step S200. The second processing unit 21 may perform image processing on the first image to which the timestamp is added and may generate a second image.

After Step S210, the second processing unit 21 temporarily stores the second image to which the timestamp is added on the buffer 22 (Step S215).

After Step S215, the second processing unit 21 transmits the second image stored on the buffer 22 in Step S215 to the first processing unit 12 (Step S220).

After Step S220, the second processing unit 21 determines whether the release signal has been received (Step S225).

When the second processing unit 21 has determined that the release signal has not been received in Step S225, Step S200 is executed. When the second processing unit 21 has determined that the release signal has been received in Step S225, the second processing unit 21 refers to the second images stored on the buffer 22 and identifies a second image to which the same timestamp is added as that added to the release signal. The second processing unit 21 records the identified second image on the recording medium 23 (Step S230).

The second processing unit 21 may record at least two second images including the identified second image on the recording medium 23. After Step S230, Step S200 is executed.

The second processing unit 21 may add a timestamp to each of two or more first images received from the first processing unit 12 and may temporarily store the two or more first images on the buffer 22. A first image and a second image generated from the first image have the same timestamps. When the release signal has been received, the second processing unit 21 may refer to the first images stored on the buffer 22 and may identify a first image to which the same timestamp is added as that added to the release signal. The second processing unit 21 may record the identified first image on the recording medium 23.

The second processing unit 21 may generate two or more second images by performing first image processing on the two or more first images received from the first processing unit 12. The second processing unit 21 may add a timestamp to each of the two or more second images. The second processing unit 21 may generate two or more third images by performing second image processing different from the first image processing on the two or more first images. For example, the first image processing is the basic image processing, and the second image processing is the advanced image processing. The second processing unit 21 may add a timestamp to each of the two or more third images and may temporarily store the two or more third images on the buffer 22.

The same second and third images have the same timestamps. When the release signal has been received, the second processing unit 21 may refer to the third images stored on the buffer 22 and may identify a third image to which the same timestamp is added as that added to the release signal. The second processing unit 21 may record the identified third image on the recording medium 23.

In the first embodiment, the image display system 1 can record a second image intended by a user on the recording medium 23 without being influenced by a delay in a network.

The first system 10 may be included in a specific medical facility, and the second system 20 may be included in the same medical facility as that including the first system 10. For example, the first system 10 is a local system in a hospital, and the second system 20 is a server in the hospital. The first system 10 and the second system 20 are connected through a local network in the hospital. Such a medical facility is not limited to a hospital, and may be a doctor's office (clinic) or a medical research institution. Since images used in the first system 10 or the second system 20 are not transmitted to the outside, the image display system 1 can maintain high security and high privacy.

Second Embodiment

Figure 4:
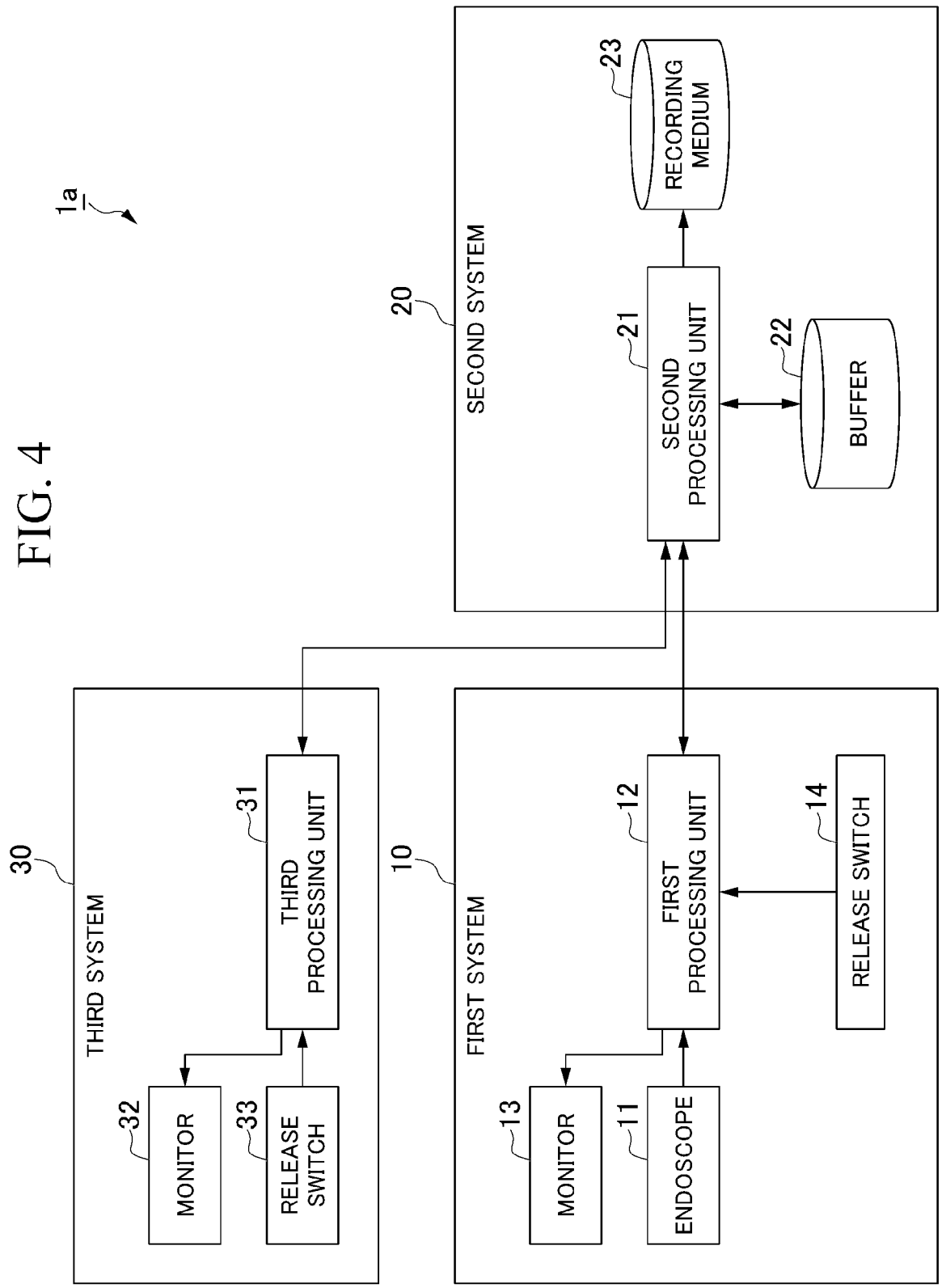
FIG. 4 is a block diagram showing a configuration of an image display system according to a second embodiment of the present invention.

A second embodiment of the present invention will be described. FIG. 4 shows a configuration of an image display system 1a according to the second embodiment. Different parts from those shown in FIG. 1 will be described.

The image display system 1a includes a first system 10, a second system 20, and a third system 30. The first system 10 is the same as that shown in FIG. 1. The second system 20 is the same as that shown in FIG. 1.

The third system 30 is different from any one of the first system 10 and the second system 20. The third system 30 includes a third processing unit 31, a monitor 32, and a release switch 33.

The second processing unit 21 sequentially transmits two or more second images to which timestamps are added to the third processing unit 31. The third processing unit 31 receives the two or more second images transmitted by the second processing unit 21. Communication between the third processing unit 31 and the second processing unit 21 is executed via a network. The third processing unit 31 sequentially outputs the two or more second images to the monitor 32.

The monitor 32 is a display such as a liquid crystal monitor. The monitor 32 sequentially displays the two or more second images output from the third processing unit 31.

The release switch 33 includes a button or the like operated by a user. The user observes the second images displayed on the monitor 32 and operates the release switch 33 in order to record a second image in which a lesion part or the like is seen. At this time, the release switch 33 outputs a release signal to the third processing unit 31.

The third processing unit 31 receives the release signal from the release switch 33. When the release signal has been received from the release switch 33, the third processing unit 31 acquires a timestamp added to a second image that is any one of the two or more second images and is displayed on the monitor 32. The third processing unit 31 transmits the release signal to which the timestamp is added to the second processing unit 21.

The second processing unit 21 receives the release signal. When the release signal has been received, the second processing unit 21 acquires, from the buffer 22, a second image to which the same timestamp is added as that added to the release signal and records the second image on the recording medium 23. The second image is the same as that displayed on the monitor 32 when the release signal has been output from the release switch 33.

The third processing unit 31 is constituted by at least one of a processor and a logic circuit. The third processing unit 31 may include one or a plurality of processors. The third processing unit 31 may include one or a plurality of logic circuits.

Figure 5:
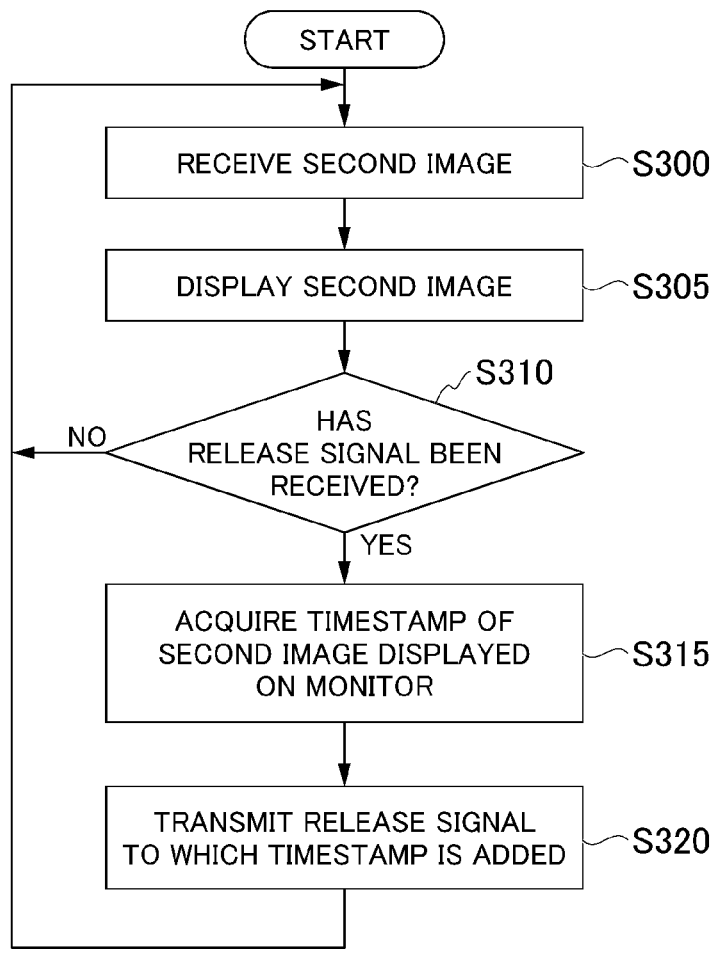
FIG. 5 is a flow chart showing a procedure of processing executed by a third processing unit included in the image display system according to the second embodiment of the present invention.

An operation of the third processing unit 31 will be described by using FIG. 5. FIG. 5 shows a procedure of processing executed by the third processing unit 31.

The third processing unit 31 receives a second image from the second processing unit 21 (Step S300). A timestamp is added to the second image. The second image is stored on a buffer not shown in FIG. 4.

After Step S300, the third processing unit 31 displays the second image received in Step S300 on the monitor 32 (Step S305).

After Step S305, the third processing unit 31 determines whether a release signal has been received (Step S310).

When the third processing unit 31 has determined that the release signal has not been received in Step S310, Step S300 is executed. When the third processing unit 31 has determined that the release signal has been received in Step S310, the third processing unit 31 acquires a timestamp added to the second image displayed on the monitor 32 from the buffer (Step S315).

After Step S315, the third processing unit 31 adds the timestamp acquired in Step S315 to the release signal. The third processing unit 31 transmits the release signal to which the timestamp is added to the second processing unit 21 (Step S320). After Step S320, Step S300 is executed.

The first processing unit 12 executes the processing shown in FIG. 2. The second processing unit 21 executes the processing shown in FIG. 3.

For example, the third system 30 is included in a different hospital from that including the first system 10. For example, a first doctor operates the release switch 14, and a second doctor who instructs the first doctor operates the release switch 33. The second doctor can instruct the first doctor while observing the same second images as those observed by the first doctor and can perform a release operation.

Third Embodiment

Figure 6:
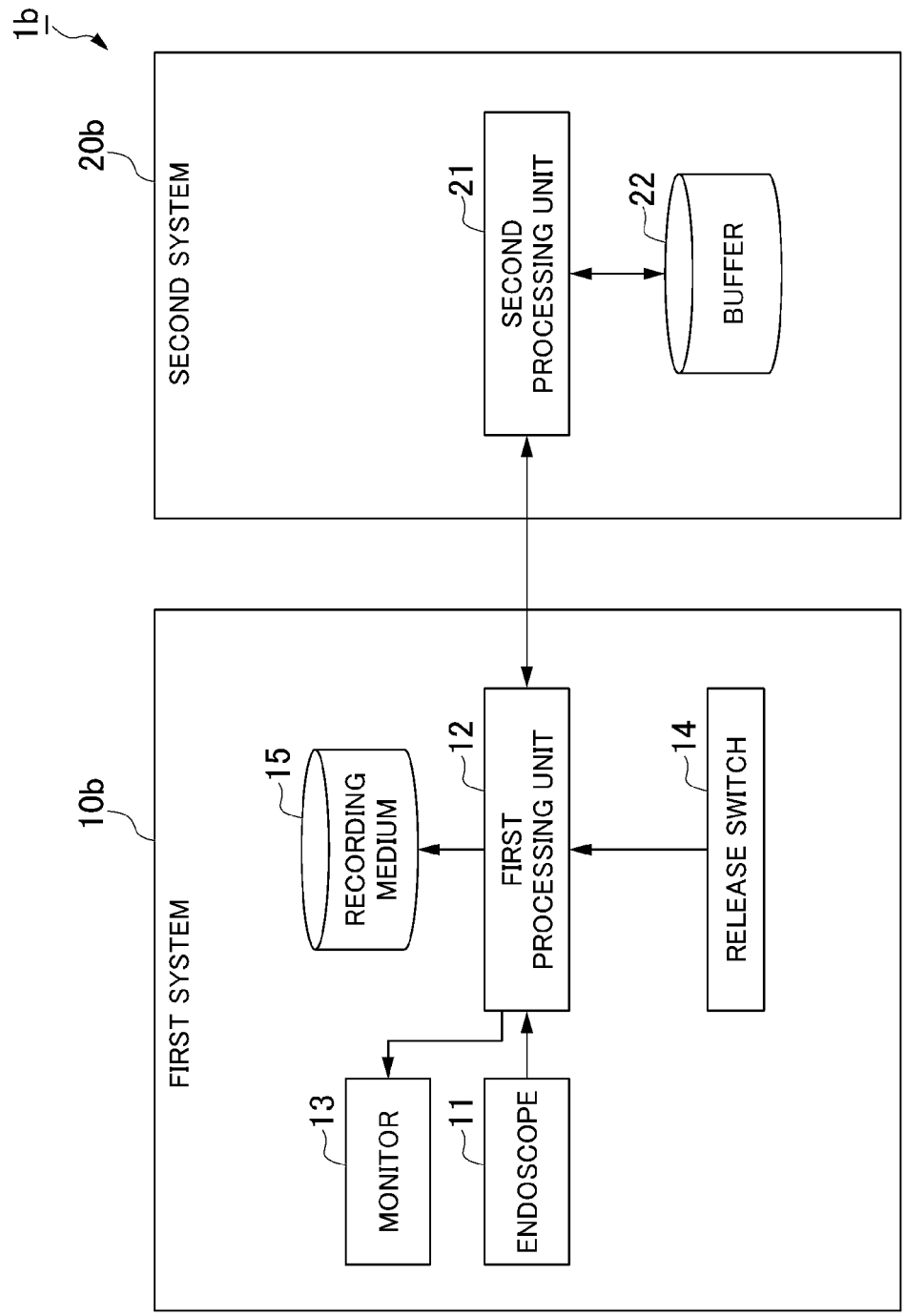
FIG. 6 is a block diagram showing a configuration of an image display system according to a third embodiment of the present invention.

A third embodiment of the present invention will be described. FIG. 6 shows a configuration of an image display system 1b according to the third embodiment. Different parts from those shown in FIG. 1 will be described.

The image display system 1b includes a first system 10b and a second system 20b. The first system 10b includes an endoscope 11, a first processing unit 12, a monitor 13, a release switch 14, and a recording medium 15. The second system 20b includes a second processing unit 21 and a buffer 22.

The recording medium 15 is a similar recording medium to the recording medium 23 shown in FIG. 1. The second system 20b does not include the recording medium 23 shown in FIG. 1.

As described above, when the release signal has been received, the second processing unit 21 acquires, from the buffer 22, a second image to which the same timestamp is added as that added to the release signal. The second processing unit 21 transmits the second image acquired from the buffer 22 to the first processing unit 12. The first processing unit 12 receives the second image transmitted by the second processing unit 21 and records the second image on the recording medium 15.

Figure 7:
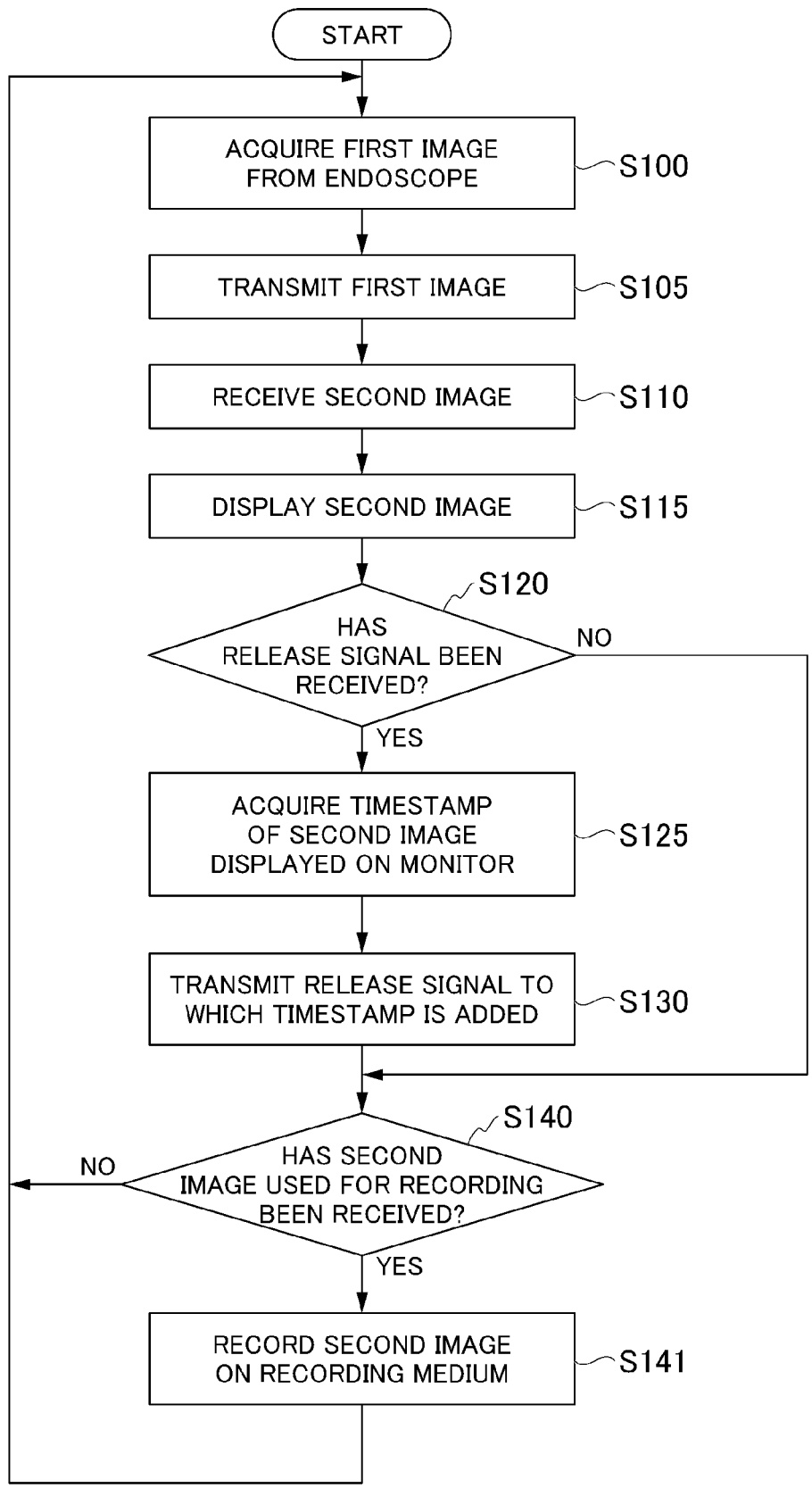
FIG. 7 is a flow chart showing a procedure of processing executed by a first processing unit included in the image display system according to the third embodiment of the present invention.

An operation of the first processing unit 12 will be described by using FIG. 7. FIG. 7 shows a procedure of processing executed by the first processing unit 12. Different processing from that shown in FIG. 2 will be described.

After Step S130, the first processing unit 12 determines whether a second image used for recording has been received (Step S140).

When the first processing unit 12 has determined that the second image used for recording has not been received in Step S140, Step S100 is executed. When the first processing unit 12 has determined that the second image used for recording has been received in Step S140, the first processing unit 12 records the second image on the recording medium 15 (Step S141). After Step S141, Step S100 is executed. When the first processing unit 12 has determined that the release signal has not been received in Step S120, Step S140 is executed.

Figure 8:
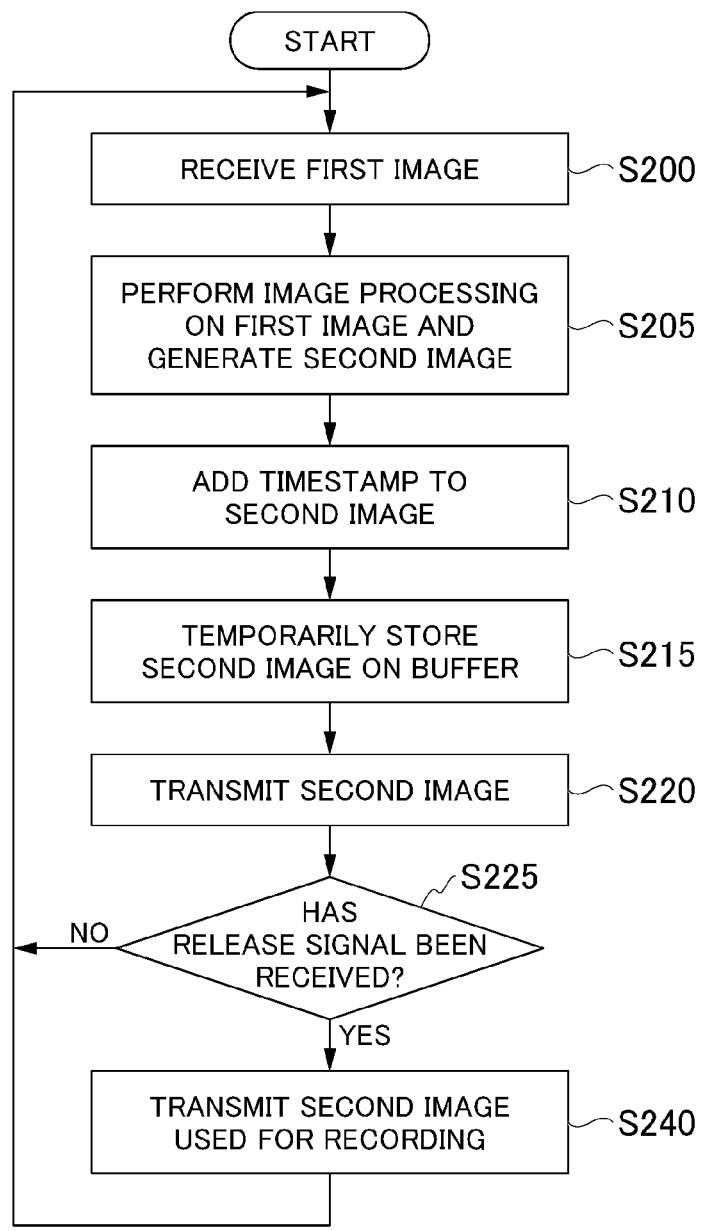
FIG. 8 is a flow chart showing a procedure of processing executed by a second processing unit included in the image display system according to the third embodiment of the present invention.

An operation of the second processing unit 21 will be described by using FIG. 8. FIG. 8 shows a procedure of processing executed by the second processing unit 21. Different processing from that shown in FIG. 3 will be described.

When the second processing unit 21 has determined that the release signal has been received in Step S225, the second processing unit 21 refers to the second images stored on the buffer 22 and identifies a second image to which the same timestamp is added as that added to the release signal. The second processing unit 21 transmits the identified second image to the first processing unit 12 as a second image used for recording (Step S240). After Step S240, Step S200 is executed.

In some cases, it is requested that no images be recorded on a recording medium outside a hospital. In such cases, the image display system 1b can record a second image on the recording medium 15 of the first system 10b.

First Modified Example

Figure 9:
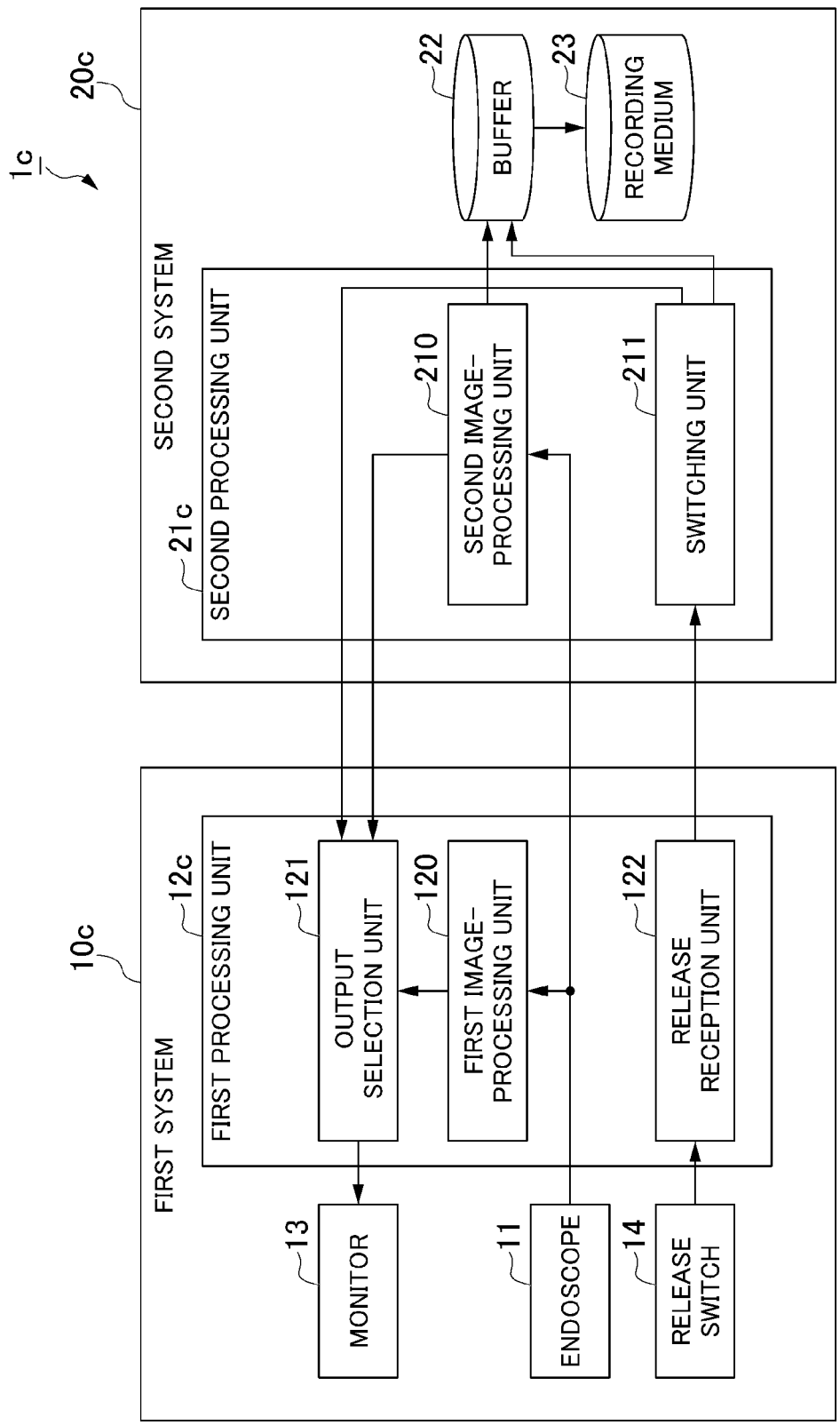
FIG. 9 is a block diagram showing a configuration of an image display system according to a first modified example of the present invention.

A first modified example of the present invention will be described. FIG. 9 shows a configuration of an image display system 1c according to the first modified example. Different parts from those shown in FIG. 1 will be described.

The image display system 1c includes a first system 10c and a second system 20c. The first system 10c includes an endoscope 11, a first processing unit 12c, a monitor 13, and a release switch 14. The second system 20c includes a second processing unit 21c, a buffer 22, and a recording medium 23.

The first processing unit 12c includes a first image-processing unit 120, an output selection unit 121, and a release reception unit 122. The second processing unit 21c includes a second image-processing unit 210 and a switching unit 211.

The first image-processing unit 120 generates two or more fourth images by performing first image processing on two or more first images output from the endoscope 11. For example, the first image processing is the basic image processing described above. The first image-processing unit 120 outputs the two or more fourth images to the output selection unit 121. The first processing unit 12c transmits the two or more first images output from the endoscope 11 to the second processing unit 21c.

The second image-processing unit 210 generates two or more second images by performing second image processing different from the first image processing on the two or more first images transmitted by the first processing unit 12c. For example, the second image processing is the advanced image processing described above. The second processing unit 21c sequentially stores the two or more second images on the buffer 22. The second processing unit 21c sequentially transmits the two or more second images to the first processing unit 12c.

The release switch 14 outputs a release signal, and the release reception unit 122 receives the release signal. The release reception unit 122 transmits the release signal to the second processing unit 21c. The switching unit 211 receives the release signal. When the release signal has been received, the switching unit 211 transmits a switching instruction to the first processing unit 12c.

The output selection unit 121 receives the two or more second images transmitted by the second processing unit 21c and the two or more fourth images output from the first image-processing unit 120. The output selection unit 121 selectively outputs the two or more second images or the two or more fourth images to the monitor 13. The output selection unit 121 receives the switching instruction transmitted by the switching unit 211.

Before the switching instruction is received, the output selection unit 121 outputs a fourth image to the monitor 13. After the switching instruction is received, the output selection unit 121 outputs a second image to the monitor 13.

Figure 10:
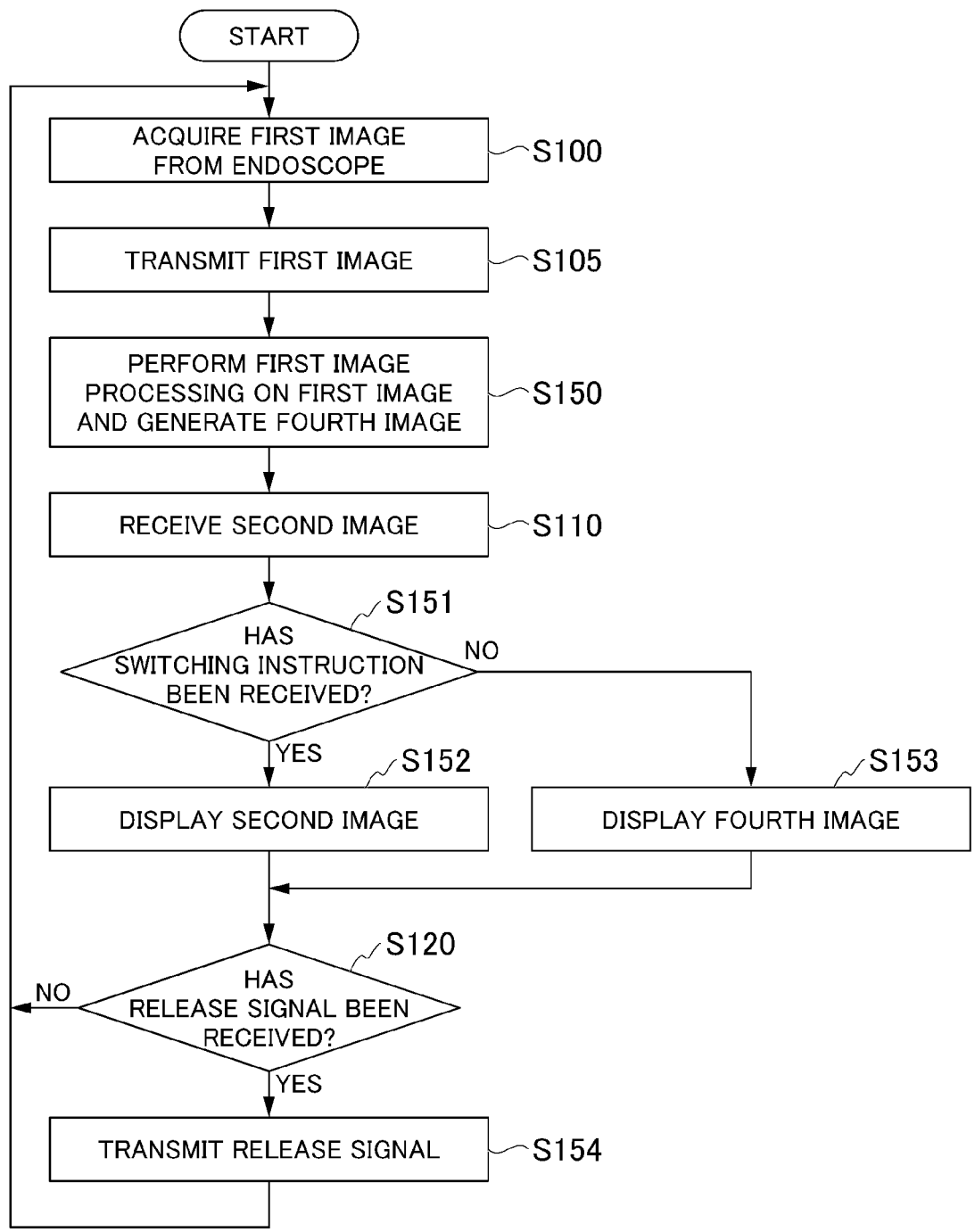
FIG. 10 is a flow chart showing a procedure of processing executed by a first processing unit included in the image display system according to the first modified example of the present invention.

An operation of the first processing unit 12c will be described by using FIG. 10. FIG. 10 shows a procedure of processing executed by the first processing unit 12c. Different processing from that shown in FIG. 2 will be described.

After Step S105, the first image-processing unit 120 generates a fourth image by performing the first image processing on the first image acquired in Step S100 (Step S150). After Step S150, Step S110 is executed.

After Step S110, the output selection unit 121 determines whether a switching instruction has been received (Step S151).

When the output selection unit 121 has determined that the switching instruction has been received in Step S151, the output selection unit 121 displays the second image received in Step S110 on the monitor 13 (Step S152). When the output selection unit 121 has determined that the switching instruction has not been received in Step S151, the output selection unit 121 displays the fourth image generated in Step S150 on the monitor 13 (Step S153). After Step S152 or Step S153, Step S120 is executed. Once the switching instruction has been received, Step S153 is executed without Step S151 being executed.

When the first processing unit 12c has determined that the release signal has been received in Step S120, the release reception unit 122 transmits the release signal to the second processing unit 21c (Step S154). After Step S154, Step S100 is executed.

Figure 11:
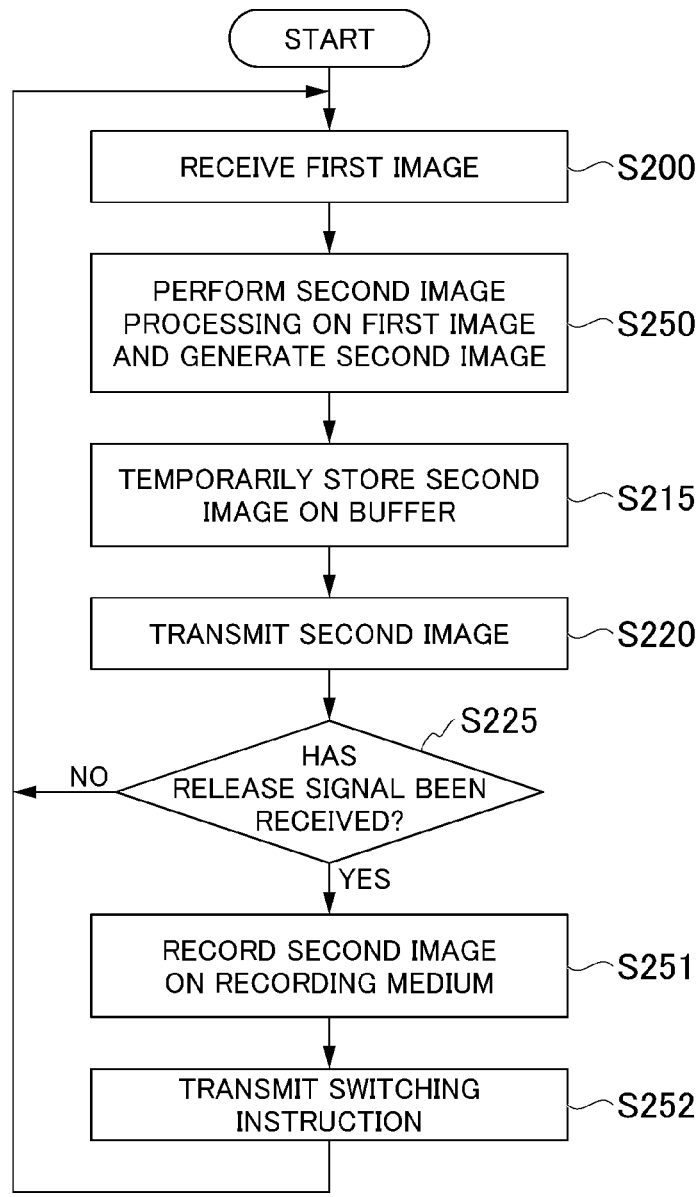
FIG. 11 is a flow chart showing a procedure of processing executed by a second processing unit included in the image display system according to the first modified example of the present invention.

An operation of the second processing unit 21c will be described by using FIG. 11. FIG. 11 shows a procedure of processing executed by the second processing unit 21c. Different processing from that shown in FIG. 3 will be described.

After Step S200, the second image-processing unit 210 performs the second image processing on the first image received in Step S200 and generates a second image (Step S250). After Step S250, Step S215 is executed.

When the second processing unit 21c has determined that the release signal has been received in Step S225, the switching unit 211 outputs a release signal to the buffer 22. A second image among the two or more second images stored on the buffer 22 is output from the buffer 22 to the recording medium 23 and is recorded on the recording medium 23 (Step S251). For example, the newest second image is output from the buffer 22 to the recording medium 23.

After Step S251, the switching unit 211 transmits a switching instruction to the first processing unit 12c (Step S252). After Step S252, Step S200 is executed.

In general image observation using an endoscope, a user thoroughly observes images acquired by the endoscope when the endoscope is to be pulled out of a living body. While the user moves the endoscope toward a deeper portion of the living body, image processing having low latency is required. On the other hand, while the user pulls the endoscope out of the living body, advanced image processing is required.

While a user moves the endoscope 11 toward a deeper portion of a living body, the output selection unit 121 outputs fourth images on which the first image processing has been performed to the monitor 13. When the endoscope 11 has reached the deepest portion of the living body, the user starts to pull out the endoscope 11. Usually, the user performs a release operation at this time. While the user pulls the endoscope 11 out of the living body, the output selection unit 121 outputs second images on which the second image processing has been performed to the monitor 13.

When a user performs any other operation than the release operation, the output selection unit 121 may switch images to be output to the monitor 13. For example, in some cases, rules stipulate that the user performs a specific operation when an endoscope has reached the deepest portion of a living body. When the user has performed the operation, the output selection unit 121 may switch images to be output to the monitor 13.

The first modified example of the present invention may be applied to the first to third embodiments of the present invention. An example in which the first modified example is applied to the first embodiment will be described. Hereinafter, an operation of the image display system 1 shown in FIG. 1 will be described. The first processing unit 12 generates two or more fourth images by performing the first image processing on two or more first images output from the endoscope 11. In addition, the first processing unit 12 transmits the two or more first images to the second processing unit 21.

The second processing unit 21 generates two or more second images by performing the second image processing on the two or more first images received from the first processing unit 12. The second processing unit 21 transmits the two or more second images to which timestamps are added to the first processing unit 12. The second processing unit 21 temporarily stores the two or more second images to which the timestamps are added on the buffer 22.

The first processing unit 12 receives the two or more second images transmitted by the second processing unit 21. The first processing unit 12 selectively outputs the two or more second images or the two or more fourth images to the monitor 13.

Before the release signal is received for the first time, the first processing unit 12 outputs the fourth images on which the first image processing has been performed to the monitor 13. When the release signal has been received for the first time, the first processing unit 12 transmits a release signal to which a timestamp is not added to the second processing unit 21. The second processing unit 21 receives the release signal and records, on the recording medium 23, a second image stored on the buffer 22.

After the release signal is received for the first time, the first processing unit 12 outputs the second images received from the second processing unit 21 to the monitor 13. When the release signal has been received for the second time, the first processing unit 12 acquires a timestamp added to a second image displayed on the monitor 13. The first processing unit 12 transmits a release signal to which the timestamp is added to the second processing unit 21.

The second processing unit 21 receives the release signal and acquires, from the buffer 22, a second image to which the same timestamp is added as that added to the release signal. The second processing unit 21 records the second image on the recording medium 23.

Second Modified Example

Figure 12:
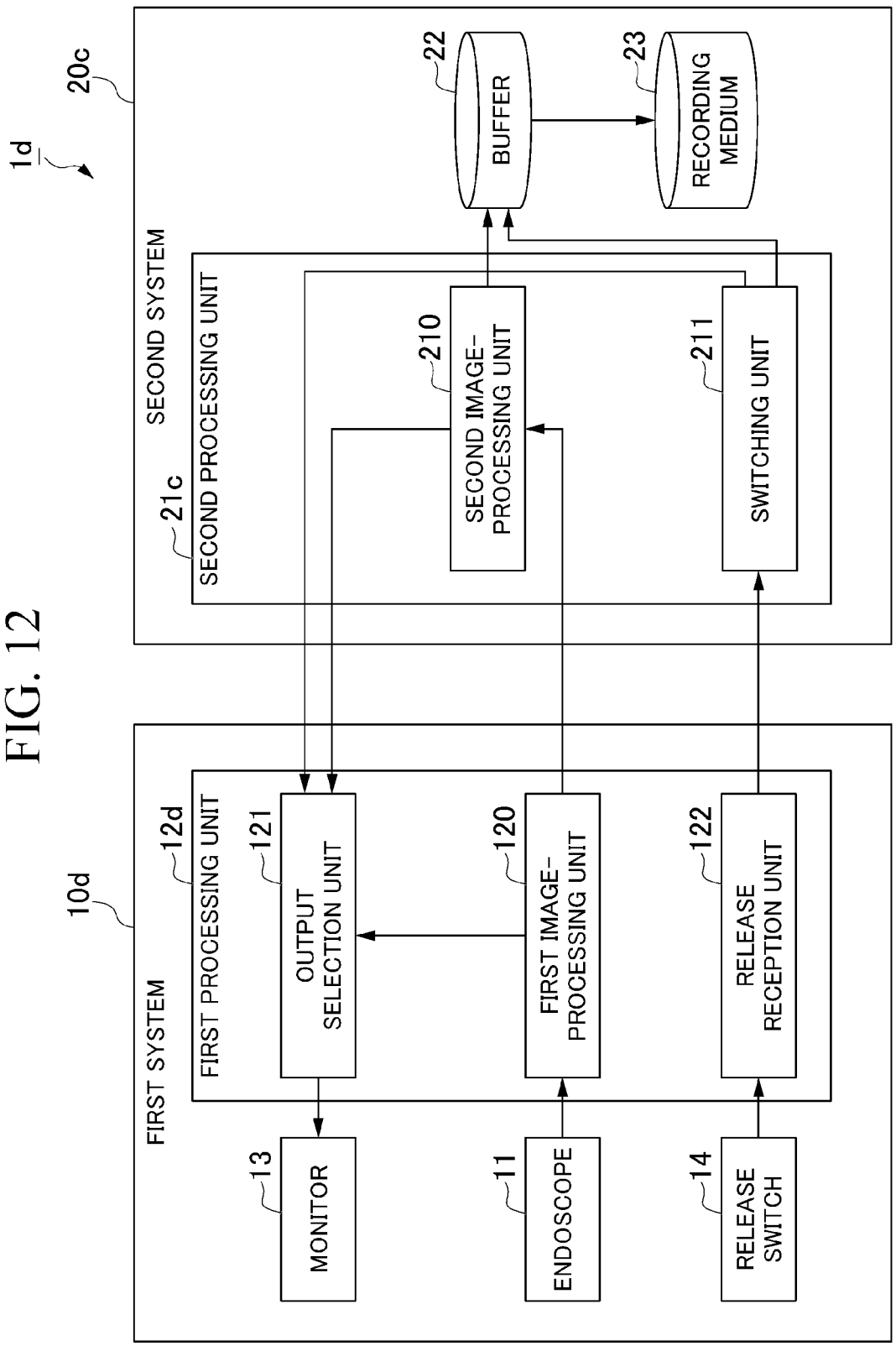
FIG. 12 is a block diagram showing a configuration of an image display system according to a second modified example of the present invention.

A second modified example of the present invention will be described. FIG. 12 shows a configuration of an image display system 1d according to the second modified example. Different parts from those shown in FIG. 9 will be described.

The image display system 1d includes a first system 10d and a second system 20c. The first system 10d includes an endoscope 11, a first processing unit 12d, a monitor 13, and a release switch 14. The second system 20c is the same as that shown in FIG. 9.

The first processing unit 12d includes a first image-processing unit 120, an output selection unit 121, and a release reception unit 122.

The first image-processing unit 120 generates two or more fourth images by performing the first image processing on two or more first images output from the endoscope 11. The first processing unit 12d outputs the two or more fourth images to the output selection unit 121 and transmits the two or more fourth images to the second processing unit 21c. The first processing unit 12c transmits the two or more second images to the second processing unit 21c in the first modified example, but the first processing unit 12d transmits the two or more fourth images to the second processing unit 21c in the second modified example.

The second image-processing unit 210 generates two or more second images by performing the second image processing on the two or more fourth images transmitted by the first processing unit 12d. The second processing unit 21c sequentially transmits the two or more second images to the first processing unit 12d.

The image display system 1d can generate the two or more second images on which the first image processing and the second image processing have been performed.

Third Modified Example

Figure 13:
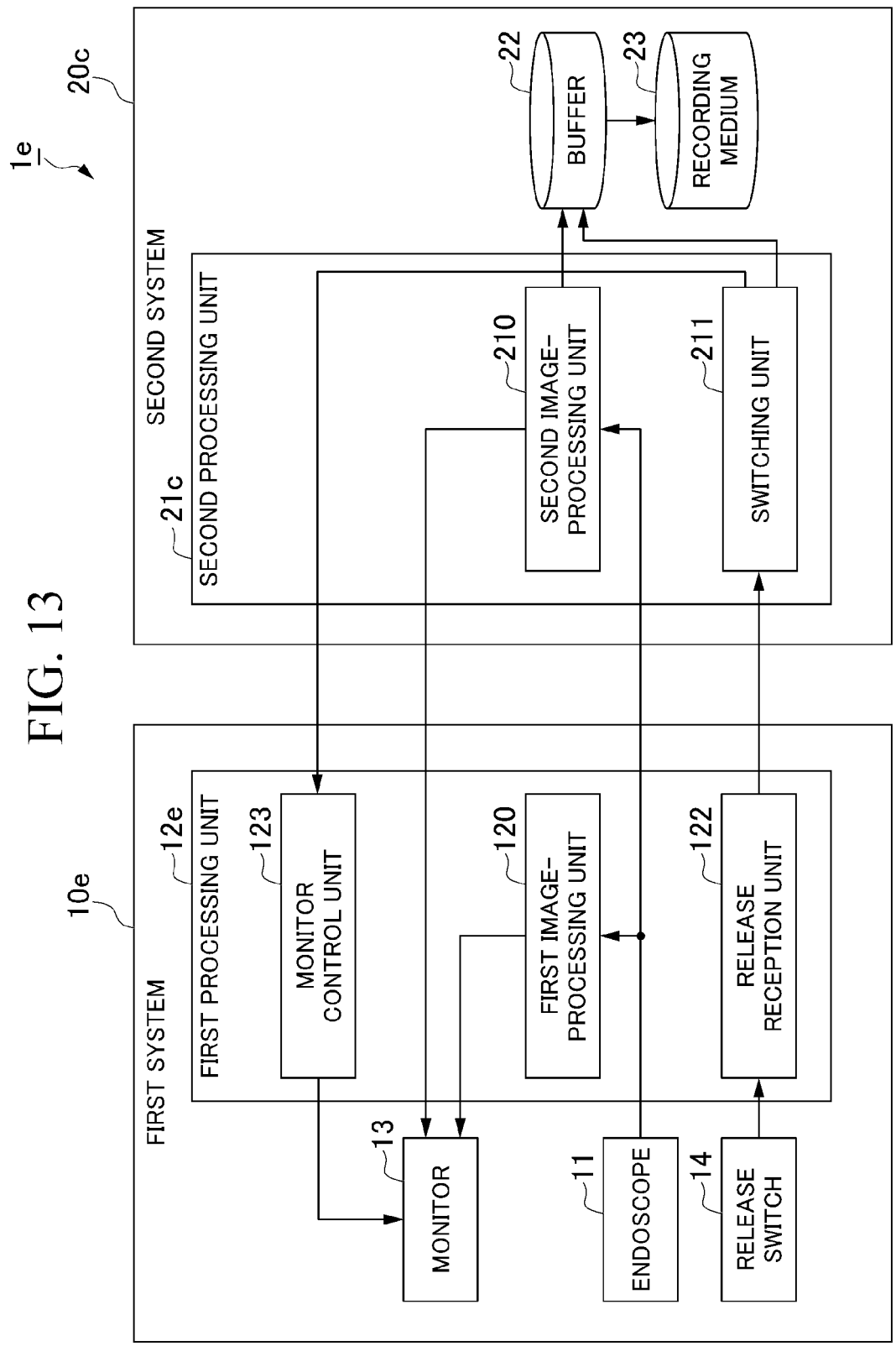
FIG. 13 is a block diagram showing a configuration of an image display system according to a third modified example of the present invention.

A third modified example of the present invention will be described. FIG. 13 shows a configuration of an image display system 1e according to the third modified example. Different parts from those shown in FIG. 9 will be described.

The image display system 1e includes a first system 10e and a second system 20c. The first system 10e includes an endoscope 11, a first processing unit 12e, a monitor 13, and a release switch 14. The second system 20c is the same as that shown in FIG. 9.

The first processing unit 12e includes a first image-processing unit 120, a release reception unit 122, and a monitor control unit 123.

The first processing unit 12e does not include the output selection unit 121 shown in FIG. 9. The first image-processing unit 120 generates two or more fourth images and outputs the two or more fourth images to the monitor 13. The first processing unit 12e receives two or more second images transmitted by the second processing unit 21c and outputs the two or more second images to the monitor 13.

The monitor 13 includes a first input terminal to which each fourth image is input and a second input terminal to which each second image is input. The monitor 13 selectively displays the fourth image input to the first input terminal and the second image input to the second input terminal.

The monitor control unit 123 receives a switching instruction transmitted by the switching unit 211. The monitor control unit 123 controls the monitor 13 based on the switching instruction.

Before the switching instruction is received, the monitor control unit 123 outputs a first control signal for displaying the fourth image to the monitor 13. When the first control signal has been input, the monitor 13 displays the fourth image input to the first input terminal. After the switching instruction is received, the monitor control unit 123 outputs a second control signal for displaying the second image to the monitor 13. When the second control signal has been input, the monitor 13 displays the second image input to the second input terminal.

The monitor 13 can switch between the fourth image and the second image.

Fourth Modified Example

Figure 14:
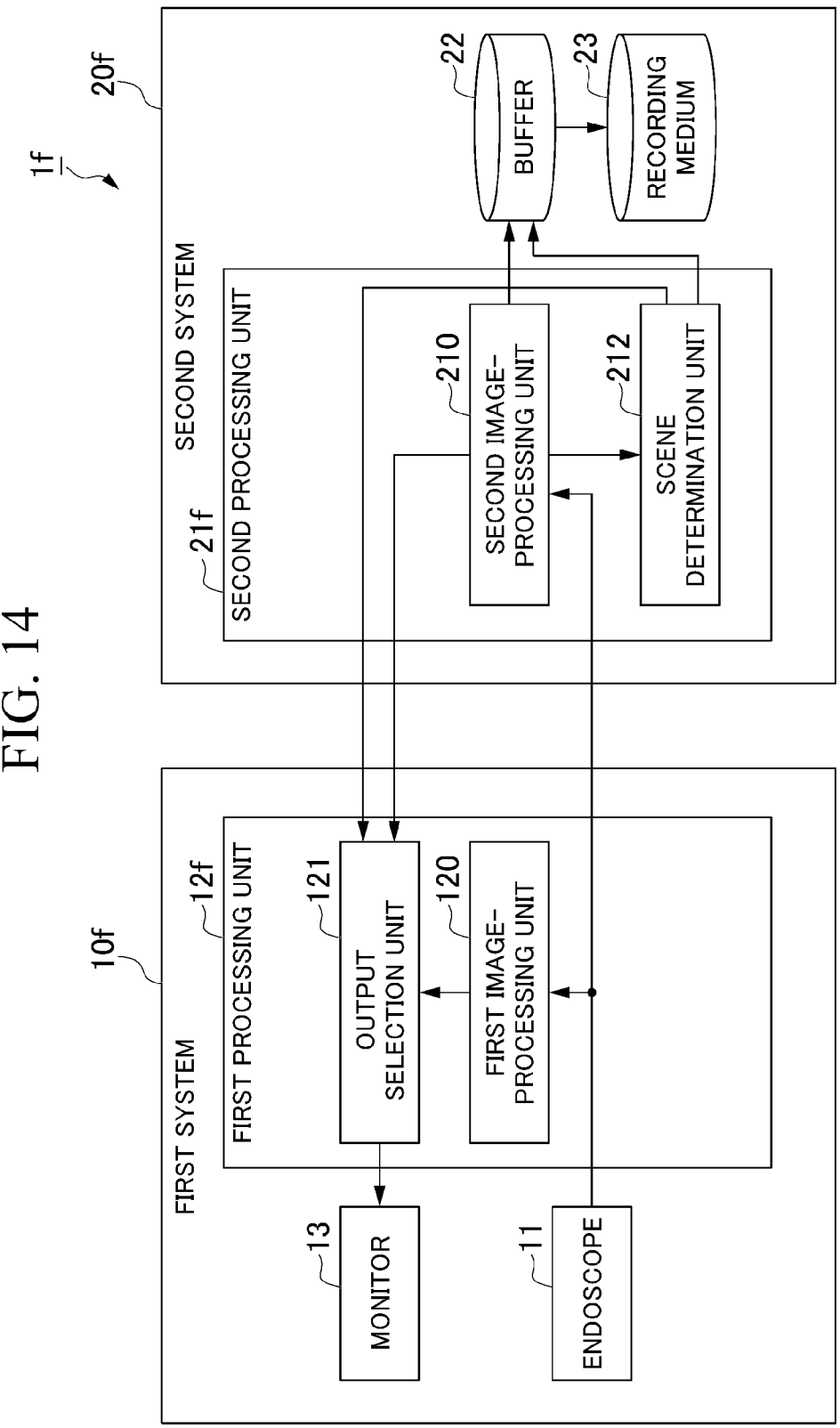
FIG. 14 is a block diagram showing a configuration of an image display system according to a fourth modified example of the present invention.

A fourth modified example of the present invention will be described. FIG. 14 shows a configuration of an image display system 1f according to the fourth modified example. Different parts from those shown in FIG. 9 will be described.

The image display system if includes a first system 10f and a second system 20f. The first system 10f includes an endoscope 11, a first processing unit 12f and a monitor 13. The second system 20f includes a second processing unit 21f, a buffer 22, and a recording medium 23.

The first system 10f does not include the release switch 14 shown in FIG. 9. The first processing unit 12f includes a first image-processing unit 120 and an output selection unit 121. The first processing unit 12f does not include the release reception unit 122 shown in FIG. 9. The second processing unit 21f includes a second image-processing unit 210 and a scene determination unit 212. The second processing unit 21f does not include the switching unit 211 shown in FIG. 9.

The second image-processing unit 210 generates two or more second images by performing the second image processing different from the first image processing on two or more first images transmitted by the first processing unit 12f. The second image-processing unit 210 sequentially outputs the two or more second images to the scene determination unit 212.

The scene determination unit 212 processes each second image and determines a scene indicating a state of inspection. When the scene determination unit 212 has determined that an endoscope has reached the deepest portion of a living body, the scene determination unit 212 transmits a switching instruction to the first processing unit 12f. The scene determination unit 212 may be realized by artificial intelligence (AI).

The image display system 1f can automatically switch images to be output to the monitor 13.

Fifth Modified Example

Figure 15:
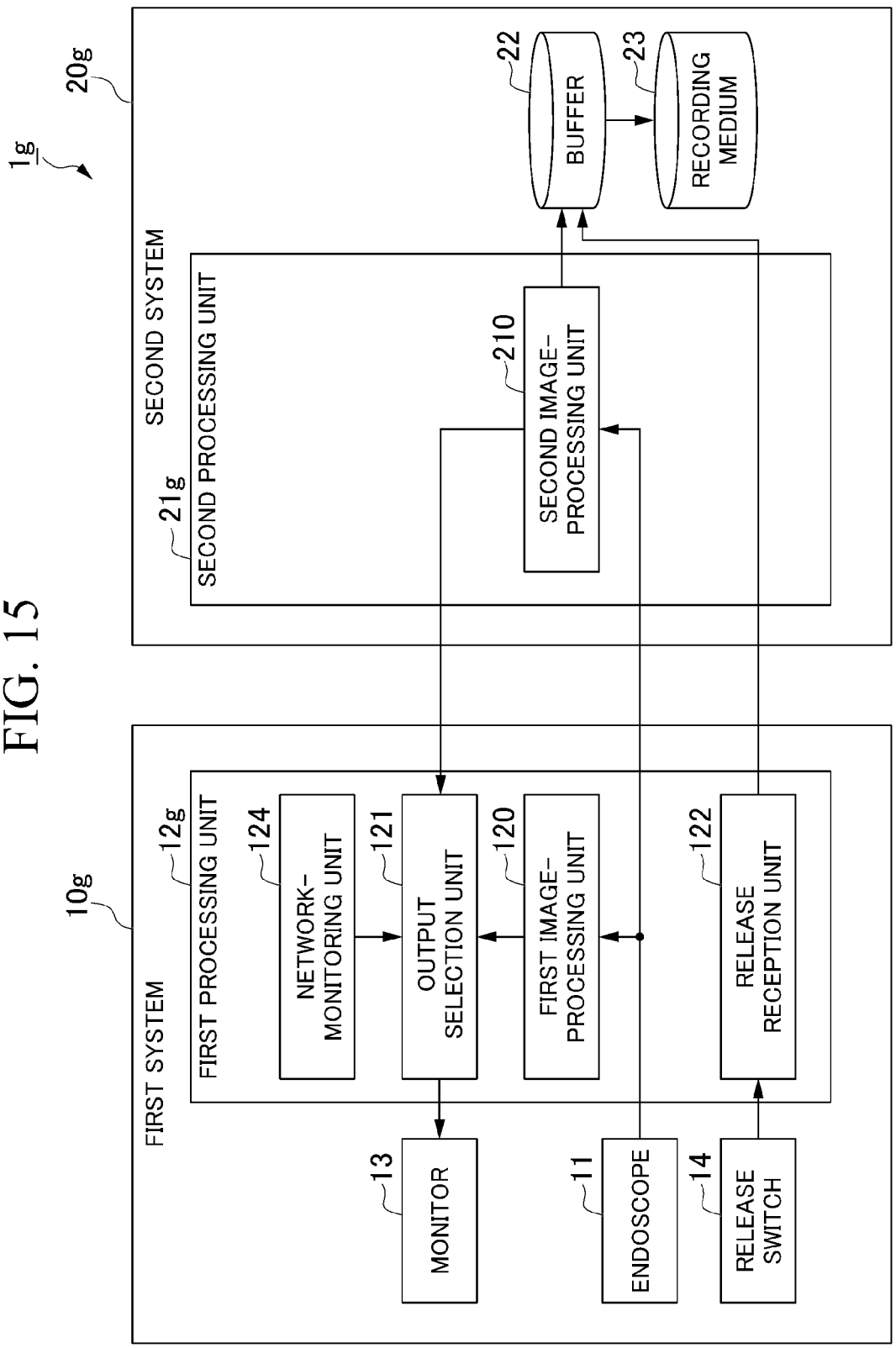
FIG. 15 is a block diagram showing a configuration of an image display system according to a fifth modified example of the present invention.

A fifth modified example of the present invention will be described. FIG. 15 shows a configuration of an image display system 1g according to the fifth modified example. Different parts from those shown in FIG. 9 will be described.

The image display system 1g includes a first system 10g and a second system 20g. The first system 10g includes an endoscope 11, a first processing unit 12g, a monitor 13, and a release switch 14. The second system 20g includes a second processing unit 21g, a buffer 22, and a recording medium 23.

The first processing unit 12g includes a first image-processing unit 120, an output selection unit 121, a release reception unit 122, and a network-monitoring unit 124. The second processing unit 21g includes a second image-processing unit 210. The second processing unit 21g does not include the switching unit 211 shown in FIG. 9.

The network-monitoring unit 124 monitors a state of a network between the first system 10g and the second system 20g. When the connection to the network has been cut off, the network-monitoring unit 124 outputs a switching instruction to the output selection unit 121. When the connection to the network is unstable or the communication speed in the network has decreased, the network-monitoring unit 124 may output the switching instruction to the output selection unit 121.

The output selection unit 121 receives two or more second images transmitted by the second processing unit 21g and two or more fourth images output from the first image-processing unit 120. The output selection unit 121 selectively outputs the two or more second images or the two or more fourth images to the monitor 13. The output selection unit 121 receives the switching instruction output from the network-monitoring unit 124.

Before the switching instruction is received, the output selection unit 121 outputs a second image to the monitor 13. After the switching instruction is received, the output selection unit 121 outputs a fourth image to the monitor 13.

It is demanded that the suspension of videos should be avoided in order to ensure safety of medical practices even when abnormality of communication has occurred. When the abnormality of communication has occurred, the image display system 1g displays the fourth images generated by the first image-processing unit 120 instead of the second images transmitted by the second processing unit 21g. Therefore, the image display system 1g can ensure the safety of medical practices.

Sixth Modified Example

Figure 16:
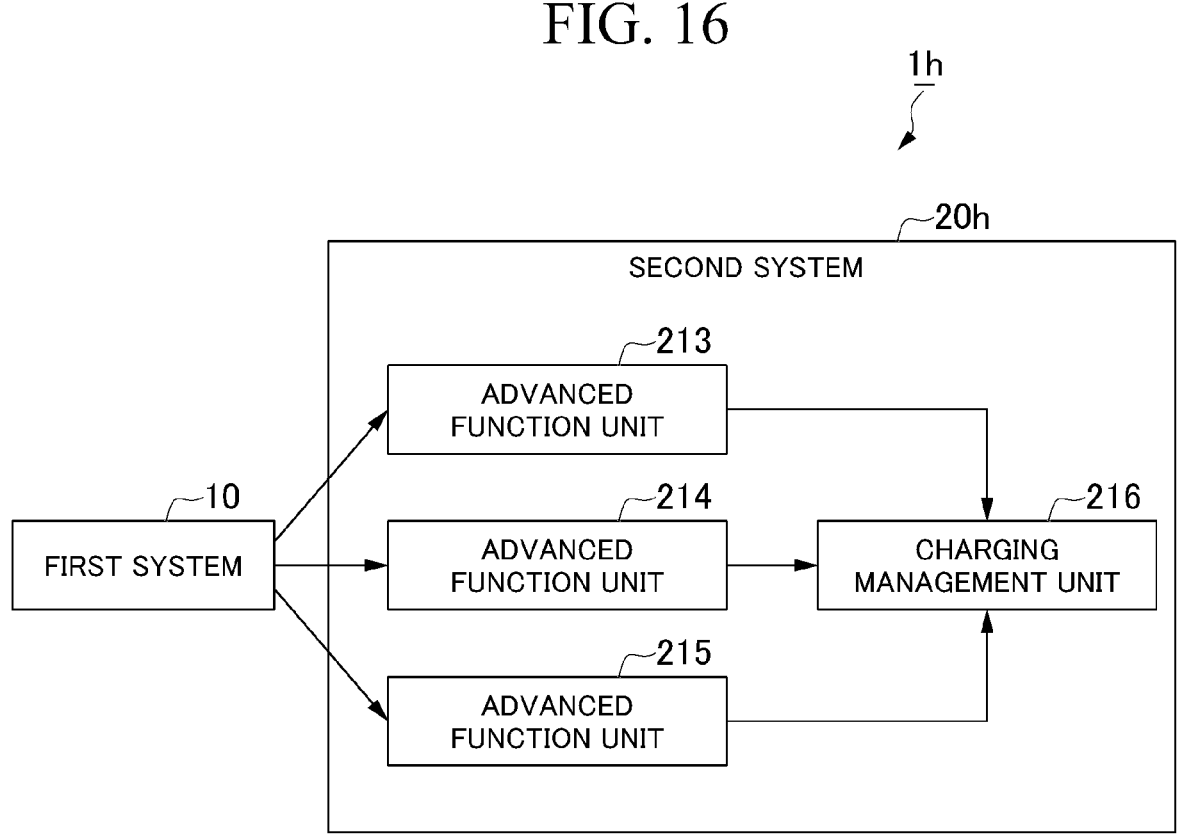
FIG. 16 is a block diagram showing a configuration of an image display system according to a sixth modified example of the present invention.

A sixth modified example of the present invention will be described. FIG. 16 shows a configuration of an image display system 1h according to the sixth modified example. The image display system 1h shown in FIG. 16 includes a first system 10 and a second system 20h. Different parts from those shown in FIG. 1 will be described.

The first system 10 is the same as that shown in FIG. 1. The second system 20h includes an advanced function unit 213, an advanced function unit 214, an advanced function unit 215, and a charging management unit 216.

The advanced function unit 213, the advanced function unit 214, and the advanced function unit 215 perform advanced image processing such as structure enhancement processing, computer-aided detection (CADe), or computer-aided diagnosis (CADx) on two or more first images received from the first system 10. The first system 10 selects at least one of the advanced function unit 213, the advanced function unit 214, and the advanced function unit 215. The advanced function unit selected by the first system 10 performs the advanced image processing.

Each of the advanced function unit 213, the advanced function unit 214, and the advanced function unit 215 outputs information indicating a state of use by the first system 10 to the charging management unit 216. The charging management unit 216 calculates usage fees based on the information output from each advanced function unit. The charging management unit 216 calculates the usage fees based on the number of times of use of each advanced function unit, a length of time of use of each advanced function unit, the number of cases, or a combination of these. The unit prices of the advanced function units are different. The second system 20h may offer a discount service in accordance with the number of times or the length of time of use of each advanced function unit. Some of the functions offered by the advanced function unit 213, the advanced function unit 214, and the advanced function unit 215 may be free of charge.

The first system 10 executes a basic function. In a case in which an advanced function is necessary, a user can pay for extra fees to use the advanced function of the second system 20h.

Seventh Modified Example

Figure 17:
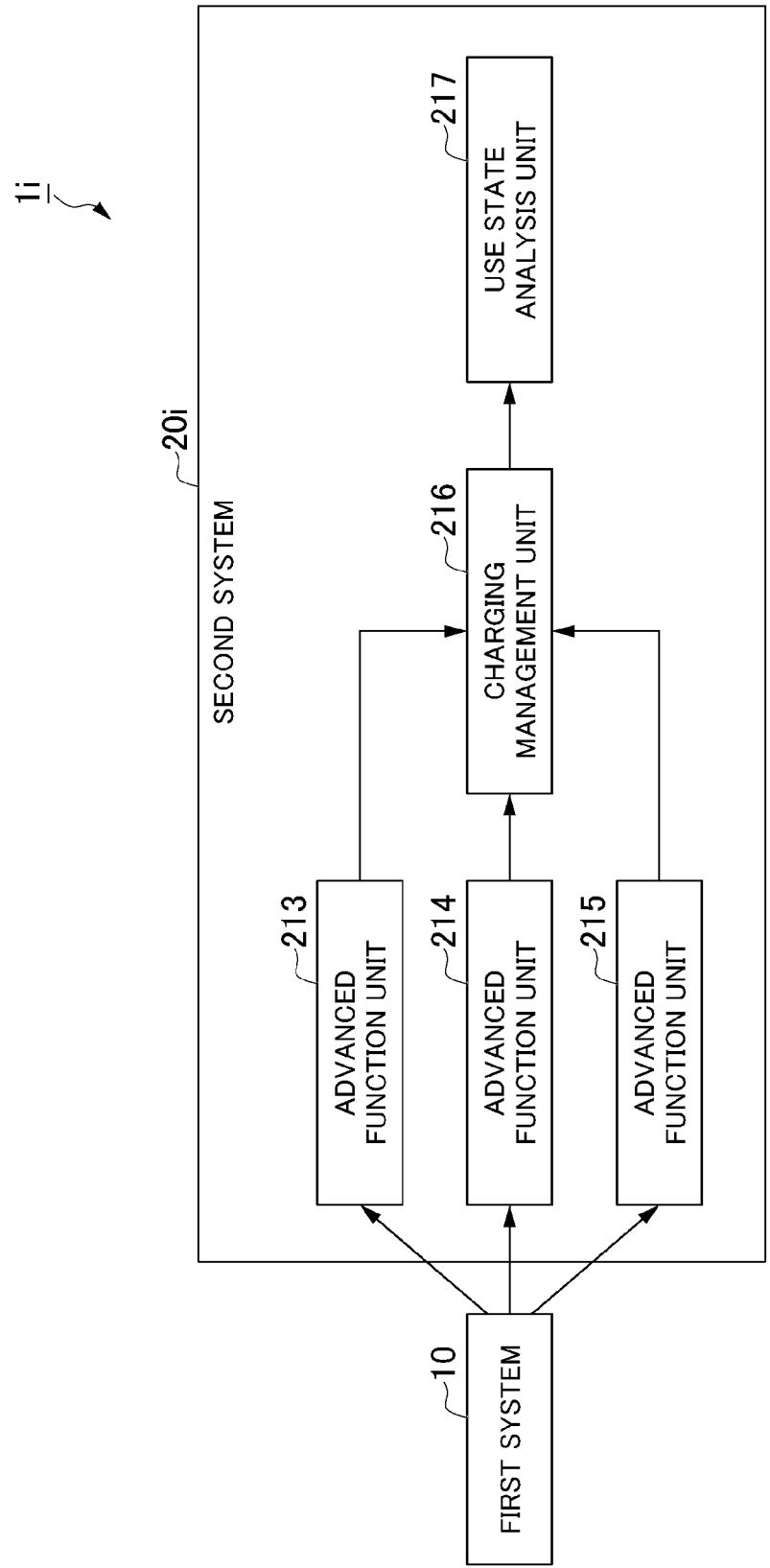
FIG. 17 is a block diagram showing a configuration of an image display system according to a seventh modified example of the present invention.

A seventh modified example of the present invention will be described. FIG. 17 shows a configuration of an image display system 1i according to the seventh modified example. The image display system 1i shown in FIG. 17 includes a first system 10 and a second system 20i. Different pans from those shown in FIG. 16 will be described.

The first system 10 is the same as that shown in FIG. 1. The second system 20i includes an advanced function unit 213, an advanced function unit 214, an advanced function unit 215, a charging management unit 216, and a use state analysis unit 217.

Each of the advanced function unit 213, the advanced function unit 214, and the advanced function unit 215 outputs information indicating a state of use by the first system 10 to the charging management unit 216 similarly to the sixth modified example. The charging management unit 216 calculates usage fees based on the information output from each advanced function unit similarly to the sixth modified example. In addition, the charging management unit 216 outputs the information output from each advanced function unit to the use state analysis unit 217.

The use state analysis unit 217 uses the information output from the charging management unit 216 to analyze a state of use of each of the advanced function unit 213, the advanced function unit 214, and the advanced function unit 215. Information obtained by the use state analysis unit 217 is utilized for marketing or sales.

For example, in a case in which a specific hospital actively utilizes a specific function, marketing of the function to hospitals having the same scale as that of the specific hospital is expected. In addition, information of an effective function for a specific disease may be obtained from states of use by a group of hospitals that are skillful at dealing with the specific disease. The information can be utilized for marketing or sales. Furthermore, the information may be the proof of future discontinuation of a rarely used function.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image display system configured to transmit two or more first images acquired by an endoscope in a first system to a second system, transmit two or more second images generated from the two or more first images in the second system to the first system, and display the two or more second images in the first system, the image display system comprising:
    a first processor, disposed in the first system, configured to:
        transmit the two or more first images acquired by the endoscope to the second system;
        receive a release signal indicating an instruction to acquire an image;
        receive the two or more second images from the second system; and
        output the two or more second images to a monitor disposed in the first system; and
    a second processor, disposed in the second system, configured to:
        receive the two or more first images from the first system;
        generate the two or more second images by processing the two or more first images;
        transmit the two or more second images to which first identification information is added to the first system; and
        store two or more temporary images on a buffer, the two or more temporary images being at least two of the two or more first images or at least two of two or more third images generated from the two or more first images, second identification information being added to the two or more temporary images, the second identification information of each of the two or more temporary images being the same as the first identification information of any one of the two or more second images,
    wherein the first processor is configured to transmit, to the second system, the first identification information added to a second image that is any one of the two or more second images and is displayed on the monitor when the release signal has been received, and
    wherein the second processor is configured to:
        receive the first identification information transmitted by the first processor; and
        acquire a temporary image to which the same second identification information is added as the first identification information received from the first processor among the two or more temporary images stored on the buffer.

2. The image display system according to claim 1, comprising a release switch that is disposed in the first system and is configured to output the release signal.

3. The image display system according to claim 2, comprising:
    a second release switch that is disposed in a third system different from any one of the first system and the second system and is configured to output a second release signal indicating an instruction to acquire an image; and
    a third processor, disposed in the third system, configured to:
        receive the second release signal;
        receive the two or more second images from the second system;
        output the two or more second images to a second monitor disposed in the third system; and
        transmit, to the second system, the first identification information added to a second image that is any one of the two or more second images and is displayed on the second monitor when the second release signal has been received,
    wherein the second processor is configured to:
        transmit the two or more second images to which the first identification information is added to the third system; and
        receive the first identification information from the third system.

4. The image display system according to claim 1, wherein the second processor is configured to record the temporary image acquired from the buffer on a recording medium disposed in the second system.

5. The image display system image display system according to claim 1,
    wherein the second processor is configured to transmit the temporary image acquired from the buffer to the first system, and
    wherein the first processor is configured to:
        receive the temporary image transmitted by the second processor; and
        record the temporary image that has been received on a recording medium disposed in the first system.

6. The image display system according to claim 1, wherein the first system and the second system are included in the same medical facility.

7. The image display system according to claim 1, wherein the second processor is configured to:
    generate the two or more second images by performing first image processing on the two or more first images; and
    generate the two or more third images by performing second image processing different from the first image processing on the two or more first images.

8. The image display system according to claim 1,
wherein the first processor is configured to:
generate two or more fourth images by performing first image processing on the two or more first images; and
selectively output the two or more second images or the two or more fourth images to the monitor, and
wherein the second processor is configured to generate the two or more second images by performing second image processing different from the first image processing on the two or more first images.

9. The image display system according to claim 1,
wherein the first identification information and the second identification information are timestamps.

10. The image display system according to claim 1,
wherein the two or more third images are the two or more second images.

11. The image display system according to claim 1,
wherein the two or more first images constitute RAW data.

12. An image-processing system configured to receive two or more first images acquired by an endoscope in an image-acquiring system including a monitor and transmit two or more second images generated from the two or more first images to the image-acquiring system, the image-processing system comprising:
a processor configured to:
receive the two or more first images from the image-acquiring system;
generate the two or more second images by processing the two or more first images;
transmit the two or more second images to which first identification information is added to the image-acquiring system;
store two or more temporary images on a buffer, the two or more temporary images being at least two of the two or more first images or at least two of two or more third images generated from the two or more first images, second identification information being added to the two or more temporary images, the second identification information of each of the two or more temporary images being the same as the first identification information of any one of the two or more second images;
receive first identification information transmitted by the image-acquiring system, the first identification information transmitted by the image-acquiring system being the same as that added to a displayed image, the displayed image being any one of the two or more second images received in the image-acquiring system, the displayed image being a second image displayed on the monitor when the release signal has been received in the image-acquiring system; and
acquire a temporary image to which the same second identification information is added as the first identification information received from the image-acquiring system among the two or more temporary images stored on the buffer.

13. An image display method of transmitting two or more first images acquired by an endoscope in a first system to a second system, transmitting two or more second images generated from the two or more first images in the second system to the first system, and displaying the two or more second images in the first system, the image display method comprising:
transmitting the two or more first images acquired by the endoscope disposed in the first system to the second system;
receiving, in the second system, the two or more first images from the first system;
generating the two or more second images by processing the two or more first images in the second system;
transmitting the two or more second images to which first identification information is added from the second system to the first system;
storing two or more temporary images on a buffer in the second system, the two or more temporary images being at least two of the two or more first images or at least two of two or more third images generated from the two or more first images, second identification information being added to the two or more temporary images, the second identification information of each of the two or more temporary images being the same as the first identification information of any one of the two or more second images;
receiving, in the first system, the two or more second images from the second system;
outputting the two or more second images to a monitor disposed in the first system;
receiving a release signal indicating an instruction to acquire an image in the first system;
transmitting, to the second system, the first identification information added to a second image that is any one of the two or more second images and is displayed on the monitor when the release signal has been received;
receiving, in the second system, the first identification information from the first system; and
acquiring a temporary image to which the same second identification information is added as the first identification information received from the first system among the two or more temporary images stored on the buffer.

14. The image display method according to claim 13,
wherein a release switch disposed in the first system outputs the release signal.

15. The image display method according to claim 14,
wherein a second release switch disposed in a third system different from any one of the first system and the second system outputs a second release signal indicating an instruction to acquire an image, and
wherein the image display method comprises:
receiving the second release signal in the third system;
transmitting the two or more second images to which the first identification information is added from the second system to the third system;
receiving, in the third system, the two or more second images from the second system;
outputting the two or more second images to a second monitor disposed in the third system;
transmitting, from the third system to the second system, the first identification information added to a second image that is any one of the two or more second images and is displayed on the second monitor when the second release signal has been received; and
receiving, in the second system, the first identification information from the third system.

16. The image display method according to claim 13, comprising
recording the temporary image acquired from the buffer on a recording medium disposed in the second system.

17. The image display method according to claim 13, comprising:
- transmitting the temporary image acquired from the buffer from the second system to the first system;
- receiving, in the first system, the temporary image from the second system; and
- recording the temporary image received in the first system on a recording medium disposed in the first system.

18. The image display method according to claim 13, wherein the first system and the second system are included in the same medical facility.

19. The image display method according to claim 13, comprising:
- generating the two or more second images by performing first image processing on the two or more first images in the second system; and
- generating the two or more third images by performing second image processing different from the first image processing on the two or more first images.

20. The image display method according to claim 13, comprising:
- generating two or more fourth images by performing first image processing on the two or more first images in the first system;
- selectively outputting the two or more second images or the two or more fourth images to the monitor in the first system; and
- generating the two or more second images by performing second image processing different from the first image processing on the two or more first images.

* * * * *